United States Patent
Izumi

(10) Patent No.: US 7,233,021 B2
(45) Date of Patent: Jun. 19, 2007

(54) ACTIVE MATRIX SUBSTRATE, ELECTROMAGNETIC DETECTOR, AND LIQUID CRYSTAL DISPLAY APPARATUS

(75) Inventor: Yoshihiro Izumi, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 63 days.

(21) Appl. No.: 10/918,444

(22) Filed: Aug. 16, 2004

(65) Prior Publication Data

US 2005/0012102 A1    Jan. 20, 2005

Related U.S. Application Data

(62) Division of application No. 10/035,442, filed on Jan. 4, 2002, now Pat. No. 6,891,194.

(30) Foreign Application Priority Data

Feb. 7, 2001  (JP)  ............... 2001-31561
Feb. 7, 2001  (JP)  ............... 2001-31566
Oct. 26, 2001 (JP)  ............... 2001-329836

(51) Int. Cl.
H01L 29/04 (2006.01)
(52) U.S. Cl. .................. 257/59; 257/72; 257/E27.131; 349/153
(58) Field of Classification Search ............ 257/59, 257/72, 347, 350, 351, E27.132, E27.131; 349/42, 43, 152, 153, 160, 158, 138, 149; 250/267, 265
See application file for complete search history.

(56) References Cited

U.S. PATENT DOCUMENTS

| | | | |
|---|---|---|---|
| 5,719,401 A | 2/1998 | Chaney et al. | |
| 6,124,917 A * | 9/2000 | Fujioka et al. | ............... 349/153 |
| 6,195,140 B1 * | 2/2001 | Kubo et al. | ................... 349/44 |
| 6,259,500 B1 | 7/2001 | Kijima et al. | |
| 6,295,109 B1 * | 9/2001 | Kubo et al. | ................. 349/119 |
| 6,441,873 B2 * | 8/2002 | Young | .......................... 349/43 |
| 6,480,577 B1 * | 11/2002 | Izumi et al. | .................. 379/40 |
| 6,605,497 B2 * | 8/2003 | Yamazaki et al. | .......... 438/166 |
| 6,638,781 B1 * | 10/2003 | Hirakata et al. | .............. 438/30 |
| 6,750,475 B1 * | 6/2004 | Izumi et al. | .................. 257/59 |

(Continued)

FOREIGN PATENT DOCUMENTS

JP           6-75238        3/1994

(Continued)

OTHER PUBLICATIONS

Japanese Office Action mailed Oct. 5, 2004 (w/English translation thereof).

(Continued)

*Primary Examiner*—Minh-Loan Tran
(74) *Attorney, Agent, or Firm*—Nixon & Vanderhye P.C.

(57) ABSTRACT

An electromagnetic detector includes an insulating substrate, whereon a charge storage capacitor, a charge collection electrode connected to the charge storage capacitor, and a semiconductor film having electromagnetic conductivity are laminated in this order. The charge collection electrode has an uneven section composed of at least a concave or convex part, dedicated for use in reinforcing a bonding strength between the semiconductor film and the charge collection electrode. With this structure, a peeling of the semiconductor film can be prevented.

19 Claims, 18 Drawing Sheets

U.S. PATENT DOCUMENTS

| | | | |
|---|---|---|---|
| 6,891,194 B2 * | 5/2005 | Izumi | 257/59 |
| 6,900,084 B1 * | 5/2005 | Yamazaki | 438/158 |
| 2001/0003476 A1 * | 6/2001 | Fujioka et al. | 349/138 |
| 2003/0089949 A1 | 5/2003 | Lin et al. | |
| 2004/0070709 A1 * | 4/2004 | Kanou et al. | 349/113 |

FOREIGN PATENT DOCUMENTS

| | | |
|---|---|---|
| JP | 07-209659 | 8/1995 |
| JP | 08-250694 | 9/1996 |
| JP | 09-033933 | 2/1997 |
| JP | 9-90426 | 4/1997 |
| JP | 11-004821 | 1/1999 |
| JP | 11-103041 | 4/1999 |
| JP | 11-109886 | 4/1999 |
| JP | 2000-171793 | 6/2000 |
| JP | 2001-15726 | 1/2001 |

OTHER PUBLICATIONS

U.S. Appl. No. 10/035,442, filed Jan. 4, 2002.

Lee et al, "A New Digital Detector Projection Radiography", SPIE, vol. 2432, pp. 237-249, May 1995.

Boer et al, "Thin Film Transistor array technology for high performance, direct conversion X-ray sensors", SPIE, vol. 3336, Medical Imaging 1998, pp. 520-528, May 1998.

Japanese Office Action mailed May 18, 2004.

* cited by examiner (AFTER HEAT TREATMENT)

US 7,233,021 B2

ACTIVE MATRIX SUBSTRATE, ELECTROMAGNETIC DETECTOR, AND LIQUID CRYSTAL DISPLAY APPARATUS

This application is a Divisional of application Ser. No. 10/035,442 filed Jan. 4, 2002 now U.S. Pat. No. 6,891,194, the entire content of which is hereby incorporated herein by reference in this application.

FIELD OF THE INVENTION

The present invention relates to an electromagnetic detector for detecting radioactive ray such as x-ray, etc., visible light or infrared ray, or other electromagnetic wave, and an active matrix substrate, and also relates to a liquid crystal display device provided with the active matrix substrate.

BACKGROUND OF THE INVENTION

A planar electromagnetic detector wherein a semiconductor film and a semiconductor sensor are arranged in a planar array, and switching elements are disposed at respective pixel electrodes is known conventionally. The semiconductor film is provided for generating charges upon detecting x-ray or other electromagnetic wave. The semiconductor sensor is mainly composed of a semiconductor film having electromagnetic conductivity and pixel electrodes (charge collection electrodes). In this conventional electromagnetic detector, the switching elements are activated line by line so as to read out the charges as generated line by line.

The detailed structure and principle of a planar image detector corresponding to the foregoing electromagnetic detector are disclosed, for example, in "D. L. Lee, et al., "A New Digital Detector for Projection Radiography", SPIE, 2432, pp. 237-249, 1995. The principle of this planar image detector will be explained in reference to FIG. 17.

As illustrated in FIG. 17, the planar image detector includes a semiconductor film 201 made of Selenium (Se) having electromagnetic conductivity, a common bias electrode 202 of a single layer formed on the semiconductor film 201, and a plurality of charge collection electrodes 203 formed under the semiconductor film 201. Each of the plurality of charge collection electrodes 203 is connected to a charge storage capacitor (Cs) 204 and a TFT element (active element) 205. Further, dielectric layers 206 and 207 which serve as electron blocking layers are formed between the semiconductor film 201 and the bias electrode 202, and between the semiconductor film 201 and the charge collection electrodes 203 respectively. To the bias electrode 202, a high voltage power supply 209 is connected. In FIG. 17, a reference numeral 208 indicates an insulating substrate.

In the above planar image detector, the semiconductor film 201 generates therein charges (electron-hole pairs) in response to x-ray or other electromagnetic wave incident thereon. In this state, the semiconductor film 201 and the charge storage capacitors 204 are connected in series. Therefore, with an applied bias voltage to the bias electrode 202, charges (electron-hole paris) as generated from the semiconductor film 201 are moved to the positive electrode side and the negative electrode side respectively, whereby charges are stored in the charge storage capacitors 204.

The charges as stored in the charge storage capacitors 204 can be read into an external equipment by activating the TFT elements 205. As described, in the foregoing planar image detector, the charge collection electrodes 203, the charge storage capacitors 204 and the TFT elements 205 are arranged in a planar array, and two-dimensional information of electromagnetic wave to be detected can be obtained by reading out the charges line by line in order.

For the semiconductor film 201 having electromagnetic conductivity, Se, CdTe, CdZnTe, $PbI_2$, $HgI_2$, SiGe, Si or similar material is typically adopted. Among all, Se (an amorphous a-Se film in particular) offers low dark current (leak current), and permits a formation of a laminated film of a large area by vacuum deposition at low temperature. For this beneficial characteristic, an Se film is often adopted for the semiconductor film 201 of electromagnetic detectors (x-ray detectors in particular) of the structure wherein the semiconductor film 201 is formed directly over the active matrix substrate 210 (see FIG. 17).

FIG. 18 is a longitudinal sectional view illustrating the detailed structure around one pixel in the foregoing electromagnetic detector.

As illustrated in FIG. 18, an active matrix substrate 210 of the electromagnetic detector includes the insulating substrate 208 made of, for example, a glass substrate, having formed thereon a gate electrode 211, a charge storage capacitor (Cs) electrode 212, a gate insulating film 213, a connection electrode (drain electrode) 214, a data electrode (source electrode) 215, an insulating protective film 216, a TFT element 205, an interlayer insulating film 217, and a charge collection electrode (pixel electrode) 203. In this interlayer insulating film 217, formed is a contact hole 218 for connecting the charge collection electrode (pixel electrode) 203 to the connection electrode 214. The electromagnetic detector further includes the semiconductor film 201 and the bias electrode 202 formed over the active matrix substrate 210.

In the active matrix substrate 210 used in the electromagnetic detector, generally, a glass substrate is adopted as the insulating substrate 208 whereon electric lines and the TFT elements 205 or other essential members are prepared by laminating a metal film (Al, Ta, etc.), a semiconductor film (a-Si or p-Si, etc.), an insulating film (SiNx, SiO, etc.), and further carrying out the patterning of the resulting multilayer structure in shapes as desired.

However, for the electromagnetic detector wherein an a-Se film as the semiconductor film 201 is formed over the active matrix substrate 210 adopting a glass substrate as the insulating substrate 208, there exists approximately 1-digit difference in thermal expansion coefficient between the thermal expansion coefficient 3 to 8 ($\times 10^{-6}$/° C.) of the glass substrate and the thermal expansion coefficient 30 to 50 ($\times 10^{-6}$/° C.) of the a-Se film, leading to the problem that the peeling of the a-Se film is liable to occur with changes in temperature.

The peeling of the a-Se film is liable to occur also by an external load exerted, for example, in a direction of bending the insulating substrate 208 Particularly, such peeling of the a-Se film is more liable to occur from the outer circumference of the a-Se film. Therefore, when adopting a large-size screen for the foregoing electromagnetic detector, the problem of the peeling of the a-Se film becomes more outstanding due to a larger difference in thermal expansion coefficient between the a-Se film and the insulating substrate 208, and the resulting warpage of the insulating substrate 208.

The above-explained peeling of the a-Se film if occurs leads to the following problem. That is, charges as generated from the a-Se film in response to, for example, x-ray incident thereon cannot reach the charge collection electrode 203 of the TFT element 205, and thus the detection of x-ray becomes impossible. Furthermore, in an even that the a-Se film starts being peeled from the outer circumference, the a-Se film is liable to be peeled even from the pixel array region, leading to serious damages.

SUMMARY OF THE INVENTION

It is therefore an object of the present invention to provide an active matrix substrate and an electromagnetic detector, which prevents a peeling of a semiconductor film or other film formed on an active matrix substrate.

In order to achieve the above object, an electromagnetic detector in accordance with the present invention is characterized by including:

an insulating substrate;

a charge storage capacitor formed above the insulating substrate;

a charge collection electrode formed above the charge storage capacitor, the charge collection electrode being connected to the charge storage capacitor;

a semiconductor layer having electromagnetic conductivity, formed over the charge collection electrode; and an uneven section formed in/on the charge collection electrode, dedicated for use in reinforcing a bonding strength between the semiconductor layer and the charge collection electrode, the uneven section being composed of at least a concave or convex part.

According to the foregoing structure, the uneven section formed in/on the charge collection electrode is provided for dedicated use in reinforcing a bonding strength between the semiconductor layer and the charge collection electrode, and the uneven section can be formed in an optimal condition for reinforcing bonding strength between the semiconductor layer and the charge collection electrode without much restricted condition in its formation area, number, or shape, etc.

Further, the semiconductor layer perfectly fits in the shape of the uneven section of the charge collection electrode to be connected thereto. Therefore, the semiconductor layer can be bonded to the charge collection electrode practically with a larger contact area, and the contact portion exhibits anchor effect which further improves a bonding strength. As a result, it is possible to prevent the peeling of the semiconductor layer even if there exits a great difference in thermal expansion coefficient between the semiconductor layer and the insulating substrate.

In order to achieve the above object, another electromagnetic detector of the present invention is characterized by including:

an active matrix substrate which includes an insulating substrate having formed thereon a charge storage capacitor, a plurality of electrode lines arranged in matrix form, an active element provided at each intersection between the electrode lines, an interlayer insulating layer formed over the electrode lines and the active element, and a charge collection electrode formed on the interlayer insulating layer, the charge collection electrode being connected to the charge storage capacitor;

a semiconductor layer having electromagnetic conductivity formed over the charge collection electrode on the active matrix substrate; and an uneven section formed in/on the charge collection electrode, dedicated for use in reinforcing a bonding strength between the semiconductor layer and the charge collection electrode, the uneven section being composed of at least a concave or convex part.

According to the foregoing structure, the uneven section formed in/on the charge collection electrode is provided for dedicated use in reinforcing a bonding strength between the semiconductor layer and the charge collection electrode, and the uneven section can be formed in an optimal condition for reinforcing bonding strength between the semiconductor layer and the charge collection electrode without much restricted condition in its formation area, number, or shape, etc.

Further, the semiconductor layer perfectly fits in the shape of the uneven section of the charge collection electrode to be connected thereto. Therefore, the semiconductor layer can be bonded to the charge collection electrode practically with a larger contact area, and the contact portion exhibits anchor effect which further improves the bonding strength. As a result, it is possible to prevent the peeling of the semiconductor layer even if there exits a great difference in thermal expansion coefficient between the semiconductor layer and the insulating substrate.

In order to achieve the above object, a still another electromagnetic detector is characterized by including:

an active matrix substrate which includes an insulating substrate having formed thereon a charge storage capacitor, a plurality of electrode lines arranged in matrix form, an active element provided at each intersection between the electrode lines, an interlayer insulating layer formed over the electrode lines and the active element, and a charge collection electrode formed on the interlayer insulating layer, the charge collection electrode being connected to the charge storage capacitor;

a semiconductor layer having electromagnetic conductivity formed over the charge collection electrode on the active matrix substrate; and an uneven section formed in/on the charge collection electrode in an area not in contact with the active element and the charge storage capacitor, the uneven section being composed of at least a concave or convex part.

According to the foregoing structure, the semiconductor layer perfectly fits in the shape of the uneven section of the charge collection electrode to be connected thereto. Therefore, the semiconductor layer can be bonded to the charge collection electrode practically with a larger contact area, and the contact portion exhibits anchor effect which further improves the bonding strength. As a result, it is possible to prevent the peeling of the semiconductor layer even if there exits a great difference in thermal expansion coefficient between the semiconductor layer and the insulating substrate.

Another object of the present invention is to provide an active matrix substrate and an electromagnetic detector, which prevent a peeling of a semiconductor film or other film formed on the active matrix substrate from its outer circumference.

In order to achieve the above object, an active matrix substrate in accordance with the present invention is characterized by including:

an insulating substrate having formed thereon a plurality of electrode lines arranged in matrix form, an active element provided at each intersection between the electrode lines, an interlayer insulating layer formed over the electrode lines and the active element, and a plurality of pixel electrodes formed on the interlayer insulating layer, wherein the interlayer insulating layer is formed so as to cover a pixel array region in which the electrode lines are arranged in matrix form and at least partially cover a marginal region surrounding the pixel array region; and an uneven section is provided in/on at least a part of an upper surface of the interlayer insulating layer formed on the marginal region, the uneven section being composed of at least a concave or convex part.

According to the foregoing structure, the interlayer insulating layer is formed so as to cover the pixel array region in which the electrode lines are arranged in matrix form and at least partially cover the marginal region surrounding the pixel array region; and the uneven section is provided in/on at least a part of the upper surface of the interlayer insulating layer formed on the marginal region, the uneven section being composed of at least a concave or convex part. The foregoing active matrix substrate is used by further laminating thereon other film(s). For example, in its application to an electromagnetic detector, a semiconductor layer is formed on the surface thereof. In this application, the semiconductor layer formed over the uneven section of the interlayer insulating layer perfectly fits in the shape of the uneven section of the interlayer insulating layer in the marginal region to be bonded thereto.

Therefore, the semiconductor layer can be bonded to the interlayer insulating layer practically with a larger contact area in the marginal region, i.e., the fringe region of the semiconductor layer, and the contact portion exhibits anchor effect which further improves a bonding strength. As a result, it is possible to prevent the peeling of the semiconductor layer in the state where the semiconductor layer is formed over the active matrix substrate, even if there exits a great difference in thermal expansion coefficient between the semiconductor layer and the insulating substrate of the active matrix substrate, or an external force is exerted in a direction of bending the active matrix substrate.

Generally, the peeling of the semiconductor layer caused by the foregoing factors is liable to start from the fringe region of the semiconductor layer. Therefore, with the foregoing structure wherein the uneven section is formed in the marginal region of the interlayer insulating layer of the active matrix substrate, the peeling of the semiconductor substrate can be surely prevented.

In order to achieve the above object, another electromagnetic detector of the present invention is characterized by including:

an active matrix substrate provided with a pixel array region where a plurality of electrode lines are arranged in matrix form, and an active element is provided at each intersection between the electrode lines, and a marginal region surrounding the pixel array region; and a semiconductor layer having electromagnetic conductivity formed over a surface of the active matrix substrate so as to cover the pixel array region and at least partially cover the marginal region, wherein an uneven section is provided in/on at least a part of a surface of the marginal region facing the semiconductor layer, the uneven section being composed of at least a concave or convex part.

According to the foregoing structure, the uneven section is provided in/on at least a part of a surface of the marginal region facing the semiconductor layer, the uneven section being composed of at least a concave or convex part. Therefore, the semiconductor layer formed over the uneven section of the interlayer insulating layer perfectly fits the shape of the uneven section on the marginal region of the active matrix substrate to be bonded thereto.

Therefore, the semiconductor layer can be bonded to the interlayer insulating layer practically with a larger contact area in the marginal region of the active matrix substrate, i.e., the fringe region of the semiconductor layer, and the contact portion exhibits anchor effect which further improves a bonding strength. As a result, it is possible to prevent the peeling of the semiconductor layer even if there exits a great difference in thermal expansion coefficient between the semiconductor layer and the active matrix substrate, or an external force is exerted in a direction of bending the active matrix substrate.

Generally, the peeling of the semiconductor layer caused by the foregoing factors is liable to start from the fringe region of the semiconductor layer. The foregoing structure with the uneven section provided on the marginal region of the active matrix substrate is therefore effective in surely preventing the peeling of the semiconductor layer.

In order to achieve the above object, another electromagnetic detector of the present invention includes an insulating substrate, whereon a plurality of electrode lines arranged in matrix form, and an active element provided at each intersection between the electrode lines, an interlayer insulating layer, a plurality of pixel electrodes, and a semiconductor layer having electromagnetic conductivity are laminated in this order, wherein an uneven section is provided in/on at least a part of a surface of the interlayer insulating layer facing the semiconductor layer, the uneven section being composed of at least a concave or convex part.

According to the foregoing structure, the uneven section is provided in/on at least a part of a surface of the interlayer insulating layer facing the semiconductor layer, the uneven section being composed of at least a concave or convex part, and thus the uneven section of the semiconductor layer perfectly fits in the uneven section of the interlayer insulating layer to be connected thereto. In this case, the uneven sections are provided, for example, in a spacing between adjacent pixels of the interlayer insulating layer.

Therefore, the semiconductor layer can be bonded to the interlayer insulating layer practically with a larger contact area in an area of the uneven section, and the contact portion exhibits anchor effect which further improves a bonding strength. As a result, it is possible to prevent the peeling of the semiconductor layer even if there exits a great difference in thermal expansion coefficient between the semiconductor layer and the insulating substrate, or an external force is exerted in a direction of bending the electromagnetic detector, the peeling of the semiconductor layer from the active matrix substrate can be surely prevented.

The other objects, features, and superior points of this invention will be made clear by the description below. Further, the advantages of this invention will be evident from the following explanation which refers to the Figures.

BRIEF DESCRIPTION OF THE DRAWINGS

FIG. 4(*b*) is an explanatory view illustrating a state of stepped parts of the uneven pattern illustrated in FIG. 4(*a*) after rounding treatment;

FIG. 5(b) is an explanatory view illustrating a state of a charge collection electrode without a cut failure resulting from the rounding treatment of the stepped parts as illustrated in FIG. 4(b);

DESCRIPTION OF THE EMBODIMENTS

First Embodiment

The following will explain one embodiment of the present invention in reference to FIG. 1 through FIG. 6.

Figure 1:
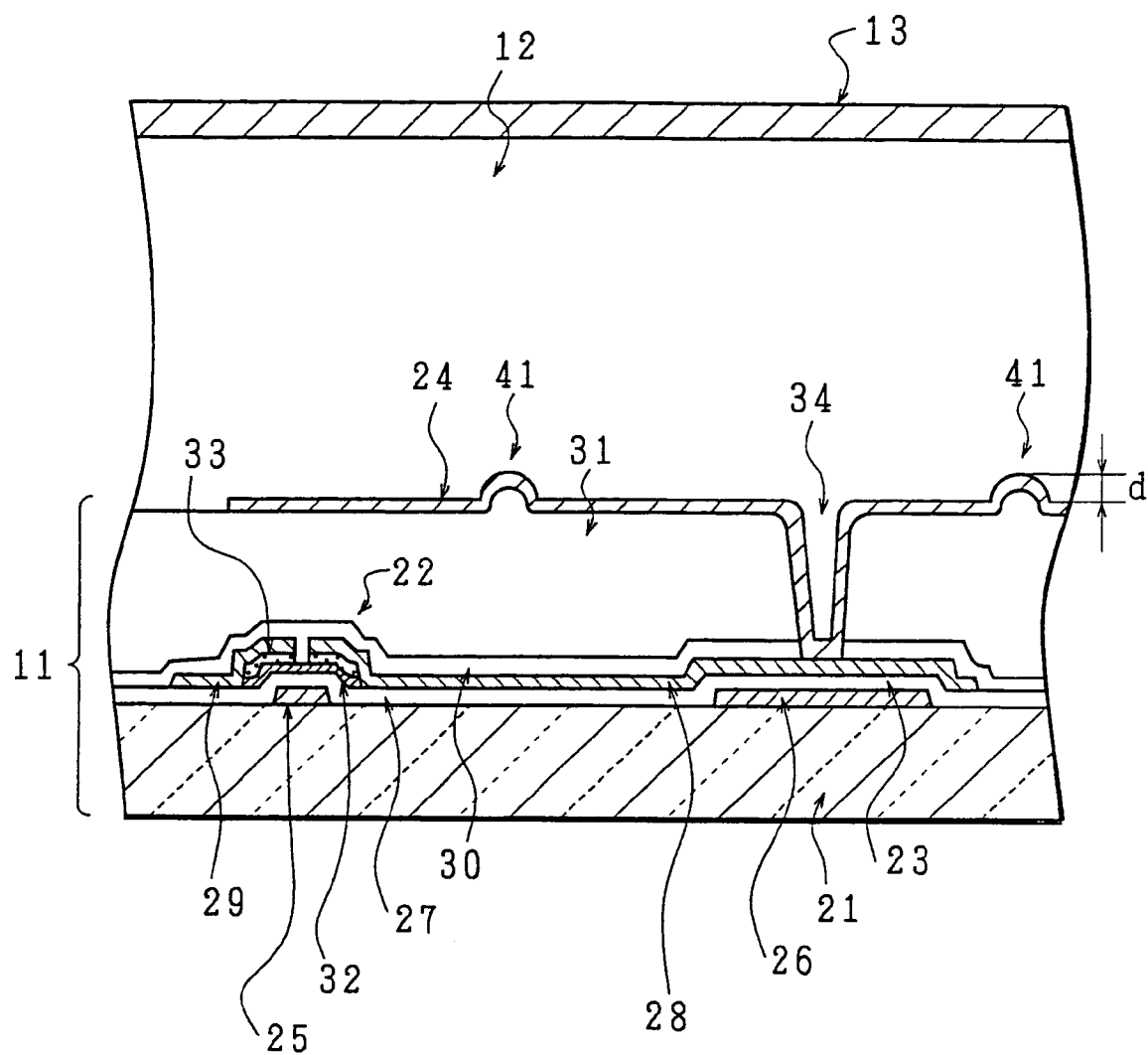
FIG. 1 which shows a structure of around one pixel in an electromagnetic detector in accordance with the present embodiment is a sectional view taken on line A-A of FIG. 2.

As illustrated in FIG. 1, an electromagnetic detector in accordance with the present embodiment is mainly made up of an active matrix substrate 11, a semiconductor film (semiconductor layer) 12, and a bias electrode (common electrode) 13. FIG. 1 is a sectional view taken on line A-A of FIG. 2. On the active matrix substrate 11, formed is an active matrix array. The semiconductor film 12 generates charges in response to electromagnetic wave to be detected by the electromagnetic detector. To the bias electrode 13, a bias voltage is applied to the semiconductor film 12.

The active matrix substrate 11 includes an insulating substrate 21 made of glass, ceramics, or similar material, whereon the above mentioned active matrix array is formed. In this active matrix array, a pixel array region is constituted by TFT elements (active elements) 22 made of a-Si, p-Si, or similar material, charge storage capacitors (Cs) 23, charge collection electrodes (pixel electrodes) 24, and gate electrodes 25 and data electrodes (source electrode) 29, etc., which are arranged in XY matrix form. These gate electrodes 25 and the data electrodes 29 constitute bus lines.

For the insulating substrate 21, a no-alkali glass substrate of small thermal expansion coefficient is typically adopted. For the active elements of the present invention, MIM elements or diode elements, etc., may be adopted other than the above-mentioned TFT elements 22.

The above-mentioned XY matrix is typically structured such that pixels in number in a range of 500×500 to 3000×3000, each pixel corresponding to a unit cell has a size in the range of 0.1×0.1 mm$^2$ to 0.3×0.3 mm$^2$, are arranged in matrix form.

For the material of the semiconductor film 12 having electromagnetic conductivity, Se, CdTe, CdZnTe, PbI$_2$, HgI$_2$, SiGe, Si, or similar material may be adopted. For an electromagnetic detector wherein the semiconductor film 12 is formed directly on the active matrix substrate 11 having formed thereon the active matrix array, an amorphous Se film (a-Se film) which permits a large size film to be formed by vacuum deposition at low temperature is the most suited. The semiconductor film 12 made of this Se film is formed by vacuum deposition in thickness of around 0.5 to 1.5 mm, preferably around 1 mm in consideration of x-ray absorption efficiency.

For the bias electrode 13 formed in the uppermost layer, for example, a conductive film made of Al, Au or similar material may be adopted. This bias electrode 13 is provided for applying a bias voltage from an externally connected high-voltage power supply.

For the charge collection electrode 24, for example, an Al film, Al alloy film (Al—Nd, Al—Zr alloy, etc.,), or a laminated Al film and other conductive film (Al/Mo, Al/Ti, etc.,), etc., of 0.1 to 0.2 µm thickness, may be adopted. In the present embodiment, the Al film, the Al alloy film and the laminated Al film and other conductive film are all referred to as a "conductive film made of a material including Al as an main component".

For the material of the charge collection electrode 24, generally, ITO film or other conductive films of various kinds may be adopted. However, in the case of adopting the a-Se film as the semiconductor film 12, a conductive film made of Al whose thermal expansion coefficient is around 24 (×10$^{-6}$/° C.) which is close to that of the a-Se film, or a conductive film made of an Al alloy including Al as a main component is desirable because the use of such semiconductor film offers an improves the bonding strength between the a-Se film, i.e., the semiconductor film 12 and the charge collection electrode 24.

The above-explained FIG. 1 is a longitudinal sectional view illustrating the detailed structure around one pixel in the foregoing electromagnetic detector.

The active matrix substrate 11 is composed of the insulating substrate 21 having formed thereon the gate electrode 25, a charge storage capacitor (Cs) electrode 26, the charge storage capacitor 23, a gate insulating film 27, a connection electrode (drain electrode) 28, the data electrode (source electrode) 29, a TFT element 22, an insulating protective film 30, an interlayer insulating film (interlayer insulating layer) 31 and the charge collection electrode (pixel electrode) 24, etc. The TFT element 22 is made up of a channel layer 32 and a contact layer 33. In the interlayer insulating film 31, provided is a contact hole 34 for connecting the charge collection electrode 24 to the connection electrode 28. Further, the semiconductor film 12 and the bias electrode 13 are formed over the foregoing active matrix substrate 11 to constitute the electromagnetic detector.

The electromagnetic detector of the present embodiment further includes an uneven section 41 composed of at least concave or convex part, formed in the charge collection electrode 24. The uneven section 41 serves as a bonding reinforcing member for reinforcing the bonding strength between the charge collection electrode 24 and the semiconductor film 12. In the example shown in FIG. 1, the uneven section 41 composed of a convex part is adopted, however, an uneven section composed of concave part or a combination of concave/convex parts may be equally adopted. Specifically, in the case of adopting the uneven sections 41, each being composed of a concave part, the structure of FIG. 1 can be applied such that the concave part of the uneven section 41 is formed in depth d (=the height of the convex part of the uneven section 41 of FIG. 1) from the surface of the charge collection electrode 24. The number of the uneven sections 41 is not particularly limited, and an appropriate number of the uneven sections 41 should be selected for each structure for reinforcing the bonding strength of the semiconductor film 12 with respect to the charge collection electrode 24. In the present embodiment, the uneven sections 41 are prepared in the following manner. First, concave parts are formed beforehand on the interlayer insulating film 31, and the charge collection electrodes 24 are then formed on the interlayer insulating film 31, thereby forming the uneven sections 41.

As illustrated in FIG. 1, the contact hole 34 goes through the interlayer insulating film 31 and reaches the surface of the connection electrode 28. Therefore, in the area where the contact hole 34 is formed, the charge collection electrode 24 is directly connected to the connection electrode 28. On the other hand, in the present embodiment, the uneven section 41 is not directly connected to the connection electrode 28 which is conducted to the TFT element 22. Also, this uneven section 41 does not serve as an electrode for obtaining an electrostatic capacitor as desired for each pixel in an area between other electrode. Namely, the uneven section 41 does not directly contact a dielectric layer for use in obtaining electrostatic capacitor as desired. As described, each of the uneven sections 41 is formed in a non-contact region with the TFT element 22 and the charge storage capacitor 23.

Figure 2:
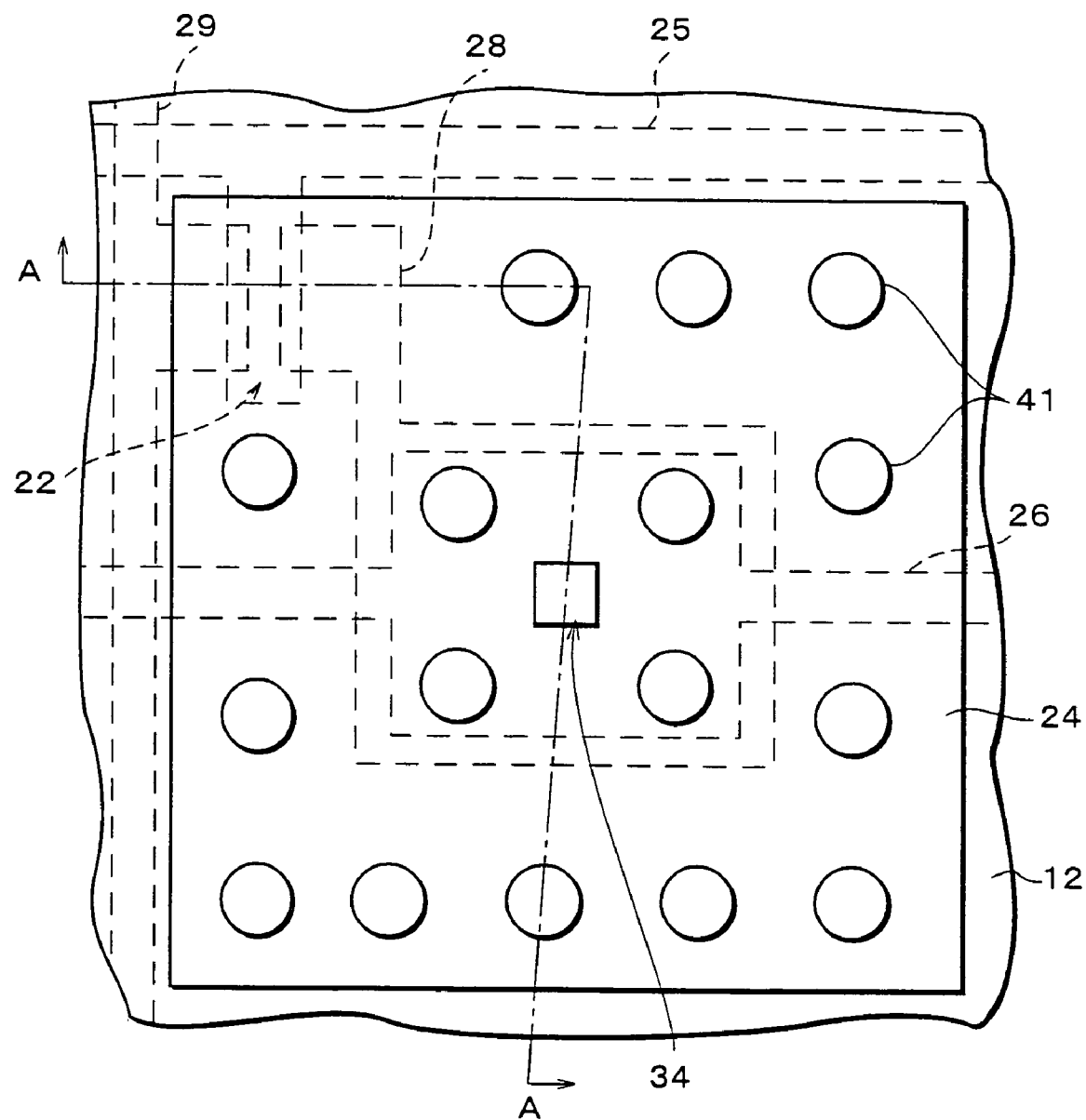
FIG. 2 is a plan view illustrating an arrangement of uneven sections formed in an active matrix substrate of the electromagnetic detector of FIG. 1.

The uneven sections 41 are arranged on the charge collection electrode 24 as illustrated in FIG. 2. FIG. 2 is a plan view illustrating the structure around one pixel of the active matrix substrate 11.

As illustrated in FIG. 2, the plurality of uneven sections 41 are arranged on the charge collection electrode 24 at appropriate intervals. However, these uneven sections 41 are not formed on the TFT elements 22. In this example, each convex part of the uneven section 41 is circular in shape when seen from above the upper surface thereof, however, a convex part in elliptical, square, striped, lattice, or wavy line shape, etc., may be equally adopted. For example, a plurality of patterns of at least convex or concave parts may be arranged on/in the charge collection electrode 24 regularly or irregularly.

If a problem occurs in that the bonding strength in specific direction becomes weaker than that in other direction by adopting the uneven sections 41 arranged in regularly, for example, the uneven sections 41 arranged irregularly (at random) (FIG. 3) on the charge collection electrode 24 may be adopted to avoid or suppress such problem.

According to the foregoing structure, the electromagnetic detector generates charges (electron-hole pairs) in the semiconductor film 12 in response to electromagnetic wave incident thereon. In this state, the semiconductor film 12 is connected to the charge storage capacitor 23 in series. Therefore, by applying bias voltage to the bias electrode 13, the charges (electron-hole pairs) generated from the semiconductor film 12 move to the positive electrode side and the negative electrode side respectively, whereby charges are stored in the charge storage capacitors 23.

Further, by activating the TFT elements 22, the charges as stored in the charge storage capacitor 23 can be read into an external amplifier circuit (not shown) via the data electrode 29. Here, the charge collection electrodes 24, the charge storage capacitors 23 and the TFT elements 22 are arranged in XY matrix form as mentioned above. Therefore, by reading out the charges line by line in order by driving the TFT elements 22, two-dimensional information of electromagnetic wave to be detected by the electromagnetic detector can be obtained.

Next, the method of manufacturing the electromagnetic detector in accordance with the present embodiment will be explained.

For the glass substrate of the insulating substrate 21, for example, no-alkali glass substrate (for example, #1737 of Corning) may be adopted. First, on this glass substrate, formed are the gate electrodes 25 and the charge storage capacitor electrodes 26 made of Ta film or Al film or other metal film. These electrodes 25 and 26 can be prepared by forming the metal film of 3000 Å thickness on the glass substrate by the sputtering deposition and then carrying out the patterning of the resulting metal film in shapes as desired.

Next, the gate insulating film 27 made of SiNx or SiOx, or similar material of around 3500 Å thickness is formed almost over the entire upper surface of the glass substrate so as to over the gate electrode 25 and the charge storage capacitor electrode 26. This gate insulating film 27 serves also as a dielectric member for the charge storage capacitors 23. The material for the gate insulating film 27 is not limited to SiNx or SiOx, and an anodic oxide film prepared by anodizing the gate electrode 25 and the charge storage capacitor electrode 26 may be used in combination.

Next, the channel layer (i-layer) 32 which serves as a channel section of the TFT element (TFT) 22, and the contact layer 33 ($n^+$-layer) for making the data electrode 29 contact the connection electrode (drain electrode) 28 are formed above the gate electrode 25 via the gate insulating film 27. These channel layer 32 and contact layer 33 are made of a-Si, and can be prepared by forming a-Si films of around 1000 Å and 400 Å thickness respectively by the CVD method and then carrying out the patterning of these a-Si films in respective shapes as desired.

Next, the data electrode 29 and the connection electrode (drain electrode) 28 are formed on the contact layer ($n^+$-layer) 33. The connection electrode 28 also serves as upper layer electrodes which constitute the charge storage capacitors 23. In the same manner as the gate insulating film 27 and the charge storage capacitor electrode 26 mentioned above, the data electrodes 29 and connection electrodes 28 are prepared by forming a metal film made of Ta or Al or similar material of 3000 Å thickness on the glass substrate by the sputtering deposition and then pattering the resulting metal film in shapes as desired.

Next, the insulating protective film 30 is formed almost over the entire surface of the insulating substrate 21 (glass substrate) having formed thereon the TFT elements 22 or the charge storage capacitors 23, etc. This insulating protective film 30 is formed by forming an SiNx film of around 3000 Å thickness by the CVD method. Here, the SiNx film is removed from the portion above the connection electrode 28, where the contact hole 34 is to be provided.

Next, the interlayer insulating film 31 is formed almost over the entire surface of the insulating protective film 30. This interlayer insulating film 31 is formed by forming a photosensitive acrylate resin film of around 3 μm thickness by a spinner or other application device. For the photosensitive organic material, polyimide resin or similar material may be equally adopted.

The interlayer insulating film 31 is then subjected to the exposure/developing processing (photolithograpy) by masking the upper surface by a photomask of a predetermined shielding pattern, thereby forming the contact hole 34. In the meantime, as illustrated in FIG. 4(a), an uneven pattern 42 is formed for use in forming the uneven sections 41. For simplification, layers interposed between the interlayer insulating film 31 and the insulating substrate 21 are omitted from FIG. 4(a).

For the contact hole 34, holes are formed so as to go through the interlayer insulating film 31 in a longitudinal direction, to expose the connection electrodes (drain electrodes) 28 in the lower layer. On the other hand, the uneven sections 41 are formed so as to have a level difference between the top portion and the bottom portion (indicative by d in FIG. 1) of around 1 μm in this example.

Thereafter, the interlayer insulating film 31 is subjected to a heat treatment as necessary, to make the stepped parts of the uneven pattern 42 smoother by the heat-melting to be shaped in a smoother uneven pattern 43 as illustrated in FIG. 4(b). Here, since an organic material is used as the interlayer insulating film 31, the stepped parts of the concave/convex pattern 42 can be rounded with an application of a heat treatment with ease. Specifically, the uneven pattern 42 is shaped into the smoother uneven pattern 43, for example, by melt-baking at 100° C. (on a hot plate for 250 seconds), and then further backing at 200° C. (in an oven for 1 hour).

As described, by rounding the stepped parts of the uneven pattern 42 (to be the smoother uneven pattern 43), a cut failure (illustrated in FIG. 5(a)) of the charge collection electrode 24 which may occur in the next step of preparing the charge collection electrodes 24 can be prevented. As a result, as illustrated in FIG. 5(b), a desirable layer for the charge collection electrodes 24 can be formed without cut failure.

Further, by adopting the charge collection electrode 24 whose surface is smoothed by the foregoing treatment, in the next step of forming, for example, the a-Se film for the semiconductor film 12 on the charge collection electrode 24 can be performed without the problem of an abnormal growth. When adopting the charge collection electrode 24 having formed thereon sharp protrusions, for example, an abnormal growth of the Se film is liable to occur by these protrusions of abnormal portions, resulting in non-uniform characteristics of the semiconductor.

Next, for the charge collection electrode (pixel electrode) 24, a conductive film is patterned on the interlayer insulating film 31 having formed thereon the plurality of uneven patterns 43 and the contact holes 34. The resulting charge collection electrode 24 is electrically connected to the connection electrode (drain electrode) 28 of each TFT element 22 via the contact hole 34. Here, the charge collection electrode 24 can be formed in shape reflecting the shapes of the uneven patterns 43 on the interlayer insulating film 31 and the contact holes 34. In the present embodiment, the charge collection electrode 24 is formed after forming the uneven patterns 43 on the interlayer insulating film 31 and holes for the contact holes 34 which go through the interlayer insulating film 31. Therefore, even when adopting a thin film for the charge collection electrode 24 of 0.1 to 0.2 μm thickness, the uneven sections 41 of 0.3 μm height or higher can be formed with ease.

As to the details of the charge collection electrodes (pixel electrodes) 24 having formed thereon uneven sections 41 and other method of preparing uneven sections 41, the manufacturing method of scattering light reflective plate (reflective electrode) developed for liquid crystal display devices may be adopted. For such method of manufacturing the scattering light reflective pixel electrode, those disclosed in, for example, Japanese Unexamined Patent Publication No. 171793/2000 (Tokukai 2000-171793, published on Jun. 23, 2000), Japanese Unexamined Patent Publication No. 6-75238/1994 (Tokukaihei 6-75238, published on Mar. 18, 1994) or Japanese Unexamined Patent Publication No. 9-90426/1997 (Tokukaihei 9-90426, published on Apr. 4, 1997) can be referred to.

Next, on the active material substrate 11 thus prepared, the electromagnetic semiconductor film 12 made of, for example, a-Se is formed over the entire pixel array region (active matrix region). This semiconductor film 12 is formed by the vacuum deposition in around 0.5 to 1.5 mm thickness, preferably 1 mm thickness.

Next, the bias electrode 13 made of Au, Al or similar material of around 2000 Å thickness is formed over the entire surface of the semiconductor film 12 by the vacuum deposition, thereby obtaining an electromagnetic detector as illustrated in FIG. 1.

Figure 18:
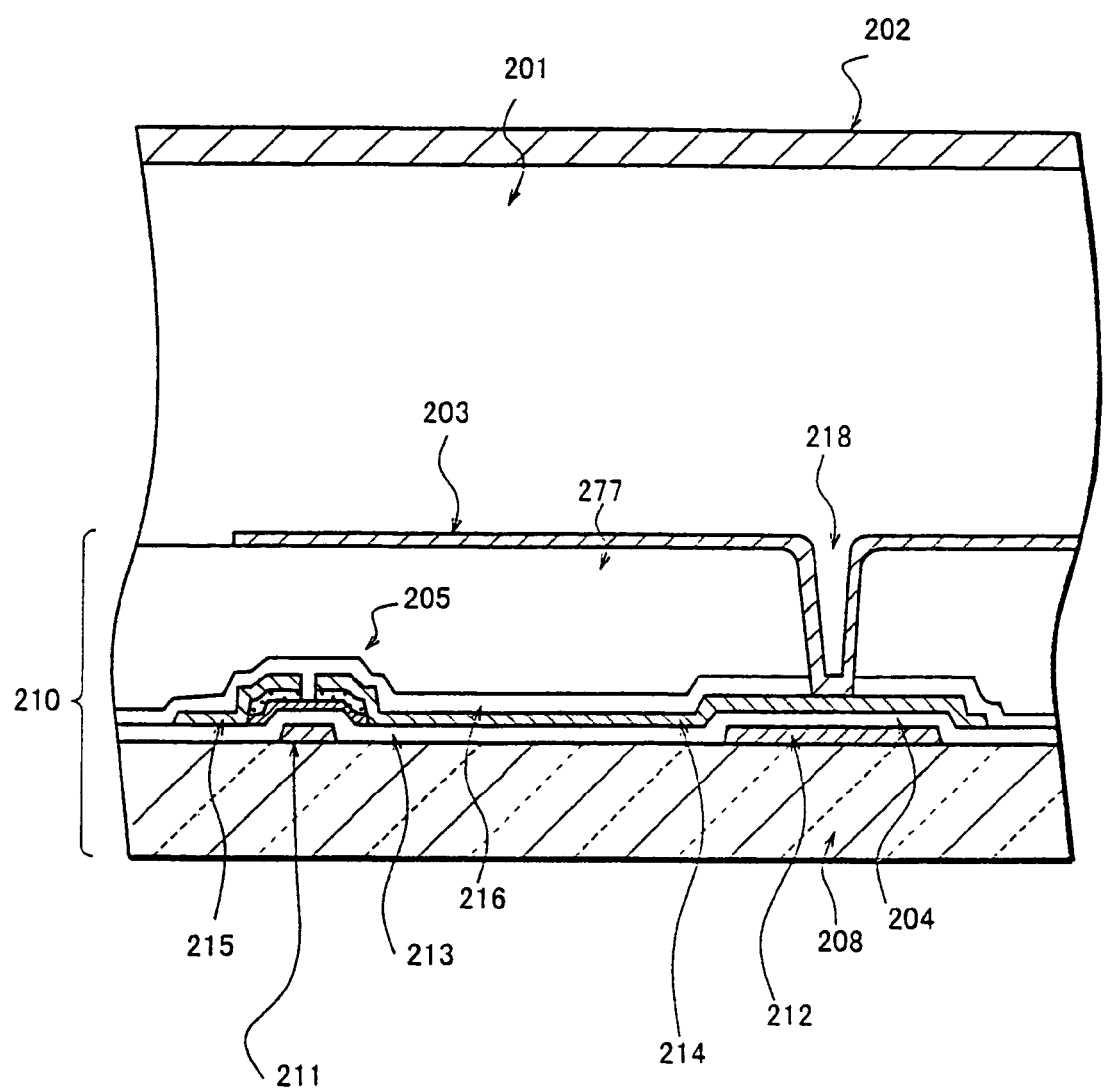
FIG. 18 is a longitudinal section view illustrating a structure around one pixel of the electromagnetic detector of FIG. 17.

As mentioned above, the electromagnetic detector of the present embodiment is arranged such that the uneven sections 41 are formed on purpose over the pixel collection electrode (pixel electrode) 24 of the active matrix substrate 11, for reinforcing the bonding strength between the semiconductor film 12 and the charge collection electrode 24. Namely, in the area of the uneven sections 41, the semiconductor film 12 perfectly fits in the shape of the contact surface of the charge collection electrode 24 to be bonded thereto. Therefore, according to the electromagnetic detector of the present embodiment, the charge collection electrode 24 offers a higher bonding strength between the semiconductor film 12 and the charge collection electrode 24 than the conventional structure adopting the charge collection electrode having a flat surface (FIG. 18), as the contact area between the semiconductor film 12 and the charge collection electrode 24 is increased by the uneven sections 41. Further, the contact portion between the semiconductor film 12 and the charge collection electrode 24 exhibits anchor effect which further reinforces the bonding strength between them.

Particularly, in the structure wherein the a-Se film is adopted for the semiconductor film 12, and the glass substrate for the insulating substrate 21 of the active matrix substrate 11, the a-Se film has a thermal expansion coefficient in a range of 30 to 50 ($\times 10^{-6}/^\circ$ C.) which is approximately 1 digit larger than the thermal expansion coefficient (3 to 8 ($\times 10^{-6}/^\circ$ C.)) of the glass substrate in general use. Therefore, the electromagnetic detector (FIG. 1) in accordance with the present embodiment eliminates the problem associated with the conventional electromagnetic detector (FIG. 18) that the peeling of the semiconductor layer 12 is liable to occur. Additionally, even when an external force is exerted in a direction of bending the electromagnetic detector, by forming the uneven sections 41, the peeling of the semiconductor film 12 caused by the deformation (bending) of the electromagnetic detector can be prevented.

As disclosed in prior art document "Thin Film Transistor array technology for high performance direct conversion x-ray sensors," Proceedings of SPIE, Medical Imaging 1988, Vol. 3336, pp 520-528 (1998), the electromagnetic detector adopting an active matrix substrate having a concave part in the upper surface, i.e., an active matrix substrate having a concave part in the charge collection electrode (pixel electrode) is known.

However, in such conventional electromagnetic detector, the concave part formed in the surface of the active matrix substrate is merely resulting from the formation of the holes in the interlayer insulating film for electrically connecting the charge collection electrodes (pixel electrodes) and the active elements (TFT elements), or the holes formed in the interlayer insulating film for forming the charge storage capacitors (Cst) using the charge collection electrodes (pixel electrodes). Namely, the concave part in the charge collection electrodes of the above Prior Art document is electrically functioned to enable the above-mentioned electronic connection and the formation of the capacitor mentioned above. Therefore, the foregoing concave parts of the above conventional electromagnetic detector are more likely to be restricted in its formation area, number, or shape, etc., for example, if there exists a significant difference between the insulating substrate of the active matrix substrate and the semiconductor film formed on the active matrix substrate. The peeling of the semiconductor film of the concave part cannot be prevented desirably.

In contrast, the electromagnetic detector in accordance with the present embodiment is provided with not only the concave parts to be functioned electrically (contract holes 34 for connecting the charge collection electrode 24 and the connection electrode 28), and stepped parts (uneven sections) which are inevitably formed by the level differences resulting from the lines formed in the lower layer of the interlayer insulating film 31, but also the uneven sections 41 for reinforcing the bonding strength between the semiconductor film 12 and the active matrix substrate 11. Here, the above-mentioned concave parts to be functioned electrically, i) a concave part prepared by connecting the charge collection electrode 24 to the TFT element 22, and/or ii) a concave part for connecting the charge collection electrode 24 to the charge capacitor electrode 23 (or a concave part which constitutes a part of the electrode of the charge storage capacitor 23).

As described, the electromagnetic detector in accordance with the present embodiment includes the active matrix substrate 11 having the charge collection electrode 24 provided with both the concave parts (contact holes 34) to be functioned electrically and the uneven sections 41 for reinforcing the bonding strength between the semiconductor film 23 and the charge collection electrode 24, and the semiconductor film 12 formed over the active matrix substrate 11.

Figure 6:
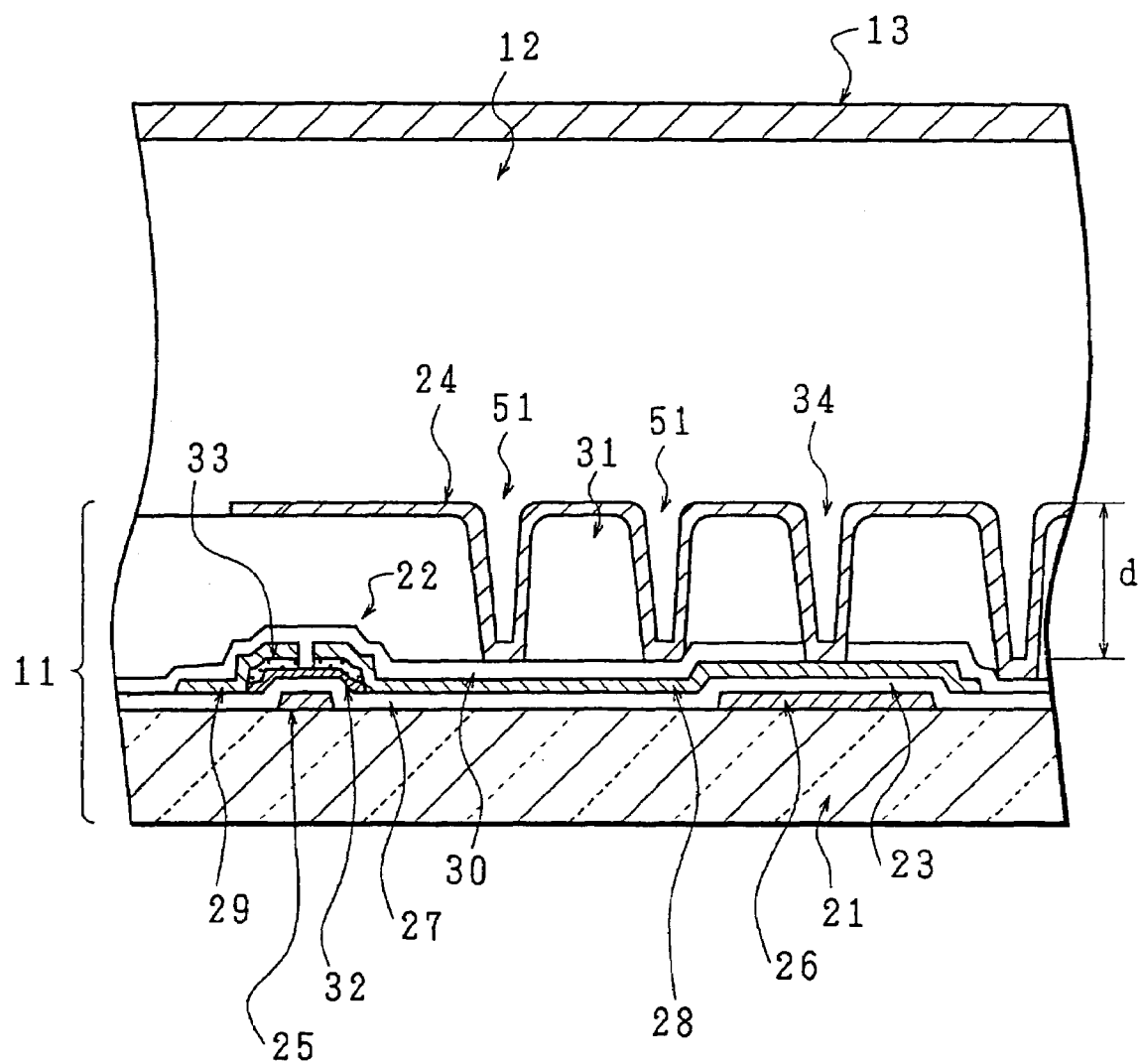
FIG. 6 is a longitudinal sectional view illustrating a detailed structure around one pixel of an electromagnetic detector in accordance with another present embodiment of the present invention.
Figure 7:
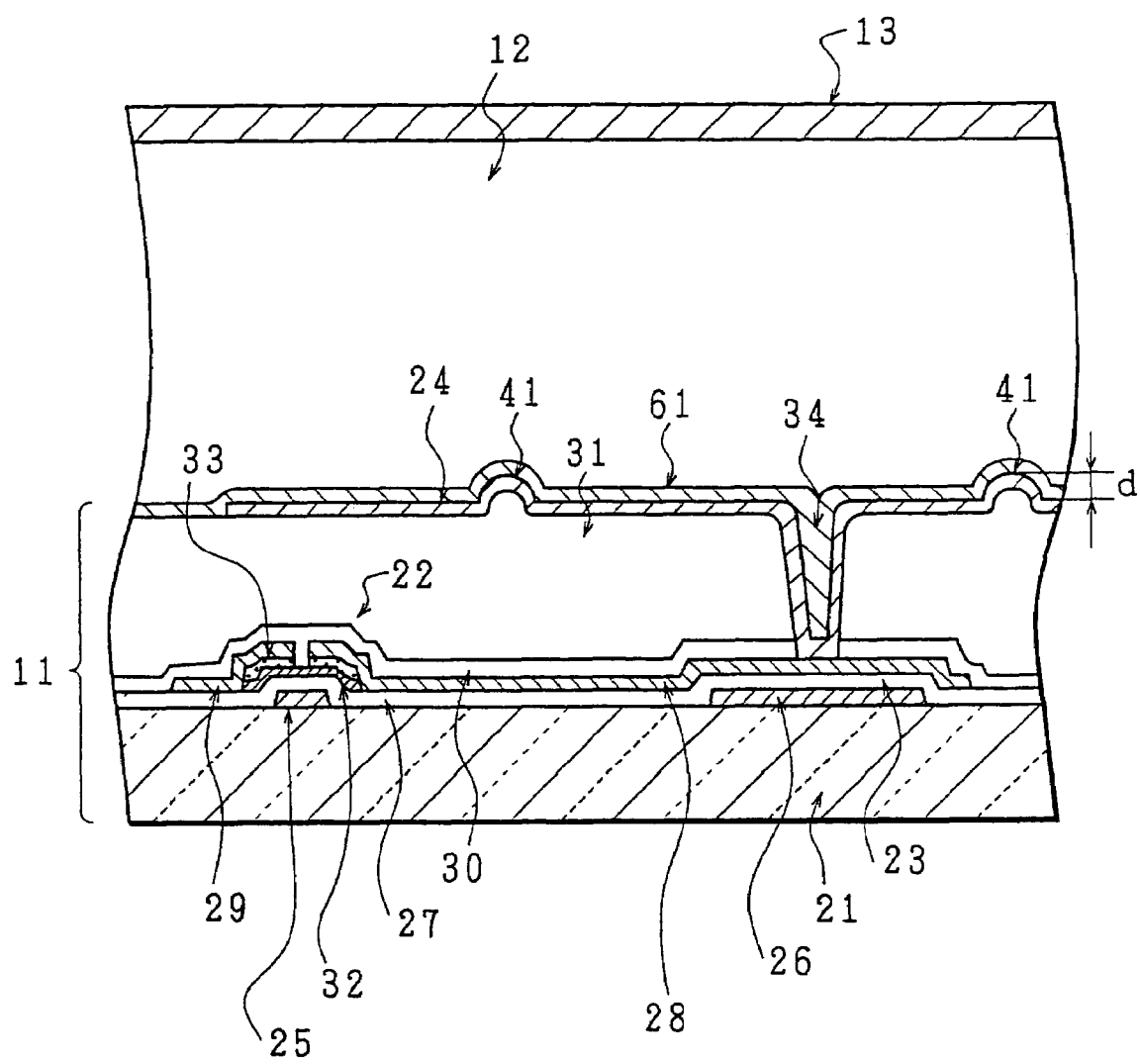
FIG. 7 is a longitudinal sectional view illustrating a detailed structure around one pixel of an electromagnetic detector in accordance with another present embodiment of the present invention.

In the electromagnetic detector of the present embodiment, the uneven sections 41 composed of convex parts are adopted, however, uneven sections 51 composed of concave parts may be adopted as illustrated in FIG. 6. In this electromagnetic detector, concave parts are formed so as to go through the interlayer insulating film 31, and then the charge collection electrode 24 is formed thereon, thereby forming the uneven sections 51 composed of concave parts.

The expected bonding strength reinforcing function between the semiconductor film 12 and the charge collection electrode 24 as achieved by forming the uneven sections 51 in the electromagnetic detector is the same as that achieved by forming the uneven sections 41 adopted in the former example; however, it is more advantageous to adopt the concave sections 51 in that the uneven sections 51 can be formed in the interlayer insulating film 31 in the process of forming the contact holes in the interlayer insulating film 31. As a result, the electromagnetic detector can be manufactured without requiring the additional step for forming the uneven sections 51, thereby preventing an increase in the steps of manufacturing the electromagnetic detector.

It has been revealed by experiments that in the electromagnetic detector in accordance with the present embodiment, in order to ensure sufficient bonding strength between the semiconductor film 12 and the charge collection electrode 24 by forming the uneven sections 41 or 51, it is preferable that the uneven sections 41 or 51 be formed in height of not less than 0.3 µm, more preferably not less than 0.5 µm. Additionally, as illustrated in FIG. 6, when adopting the uneven sections 51 composed of concave parts, the upper limit for the depth of the concave parts is equal to the upper limit for the thickness t of the interlayer insulating film 31. The depth of the concave part of each uneven section 51 is maximized when holes which go through the interlayer insulating film 31 are adopted for the uneven sections 51. Therefore, the effective range for the depth d of the uneven sections 51 can be defined as 0.3 µm$\leq$d$\leq$t.

The uneven sections 41 or 51 of the present embodiment offer a greater effect of increasing the contact area between the semiconductor film 12 and the charge collection electrode 24 and the anchor effect by setting the height or depth of the uneven sections 41 or 51 larger if the size of the uneven sections 41 or 51 or the density thereof in the charge collection electrode 24 are the same. Therefore, for the function of preventing the peeling of the semiconductor film 12, the most desirable condition for the height/depth d of the uneven sections 41 or 51 is "d=t" as illustrated in the structure of FIG. 6.

It has been revealed by experiments that when adopting the interlayer insulating film 31 thicker than 10 µm, the coverage of the charge collection electrode 24 formed on the interlayer insulating film 31 is adversely affected. Therefore, an effective range for the thickness of the interlayer insulating film 31 can be defined as t$\leq$10 µm. In view of the foregoing, in the electromagnetic detector of the present embodiment, a desirable range for the depth d can be defined as 0.3 μm ≦ d ≦ 10 μm.

For the uneven sections 41 composed of convex parts, the upper limit for the height d of each concave part may be set to 5 μm (d ≦ 5 μm). Further, it is preferable that the side face of the uneven section 41 or 51 be inclined at an angle in a range of 20 to 70°.

Next, the relation between the density of the uneven sections 41 or 51 in the charge collection electrode 24 and the effects of reinforcing the bonding strength will be explained.

For example, it is revealed by the experiments that when adopting the uneven sections 41 prepared by forming circular quaquaversal shape convex patterns (diameter: 3 μm, height: 2 μm) at random, the bonding strength is improved by the structure wherein the uneven sections 41 cover not less than 10 percent of the area of the charge collection electrode 24.

As a result of other experiments, although absolute values indicative of the bonding strength differ among the experiments, some improvements in reinforcing the bonding strength could be achieved. The foregoing experiments therefore reveal that it is effective to provide the uneven sections 41 or 51 cover not less than 10 percent of the area of the charge collection electrode, more preferably not less than 30 percent.

Further, by increasing the number of uneven sections 41 or 51, it is possible to substantially increase the contact area between the semiconductor film 12 and the charge collection electrodes 24, and thus, the bonding strength between them can be improved effectively. Specifically, it is preferable that the uneven sections 41 (or uneven sections 51) be formed in number of not less than 5 per pixel.

Figure 3:
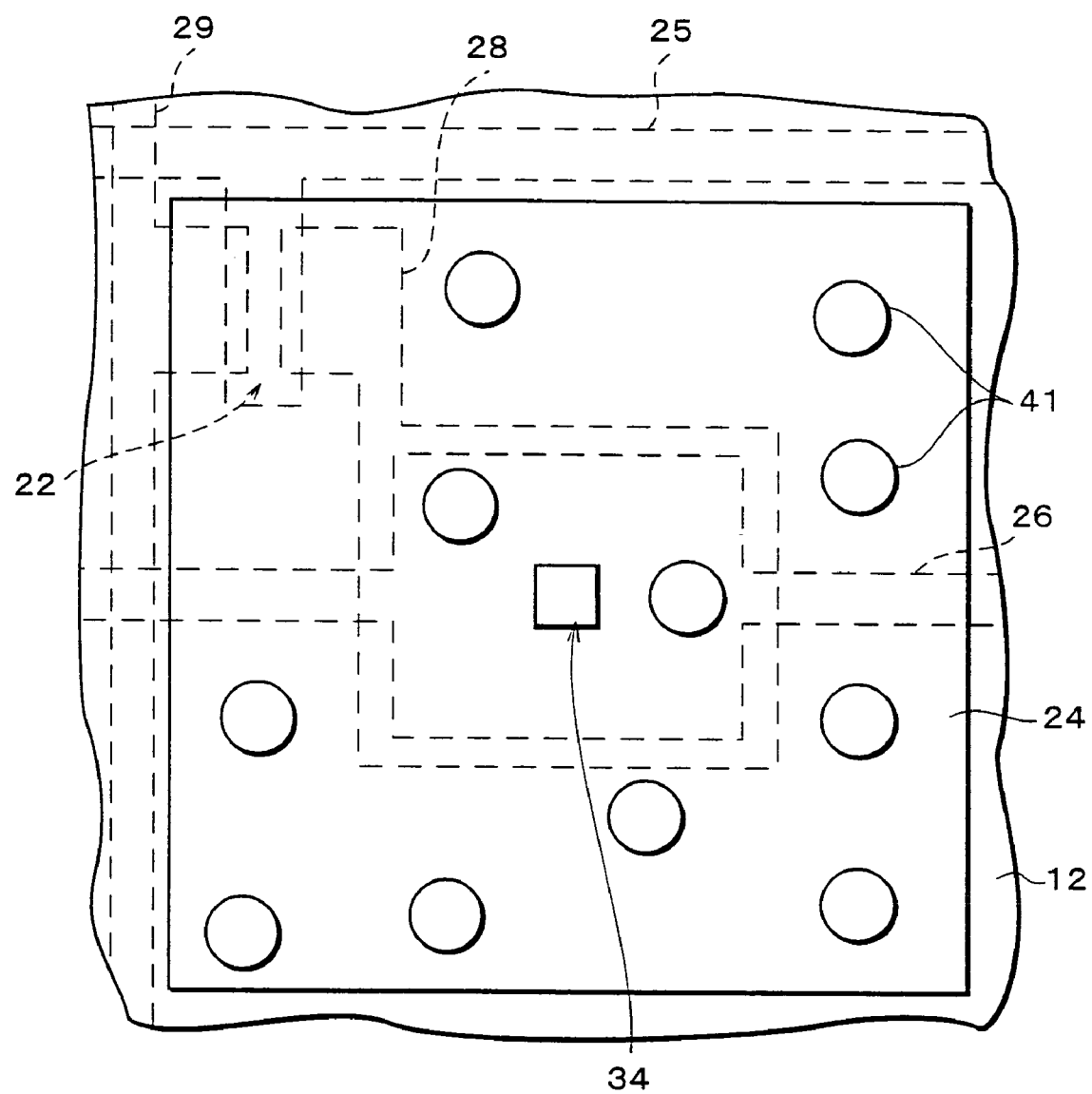
FIG. 3 is plan view showing another arrangement of uneven sections formed in the active matrix substrate of FIG. 2.
Figure 4:
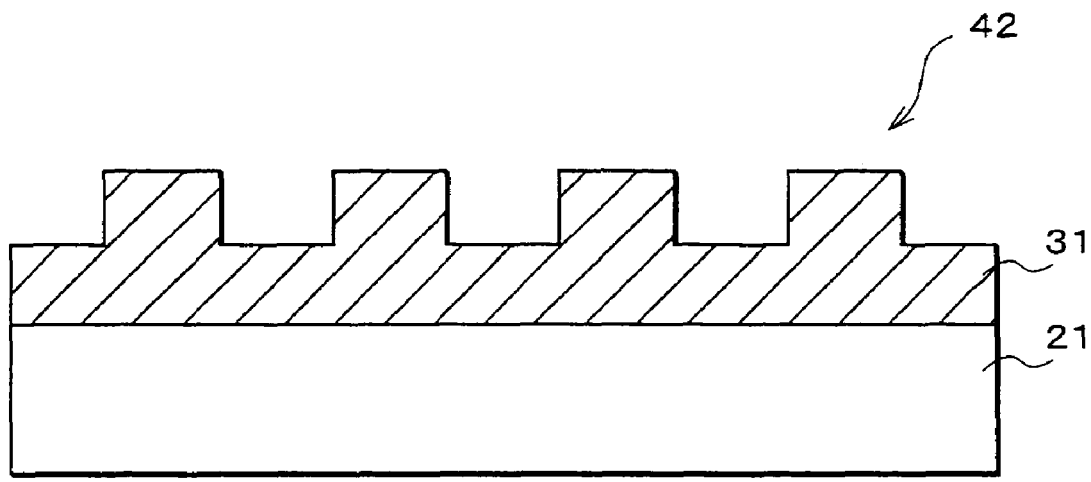
FIG. 4(*a*) is an explanatory view illustrating the process of forming an uneven pattern in an interlayer insulating film for forming uneven sections of the electromagnetic detector of FIG. 1.
Figure 4:
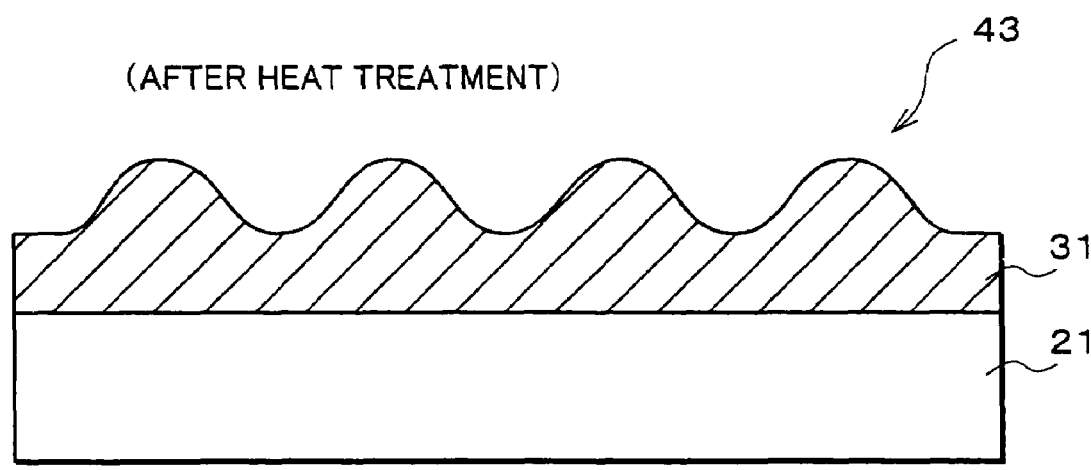
Figure 5:
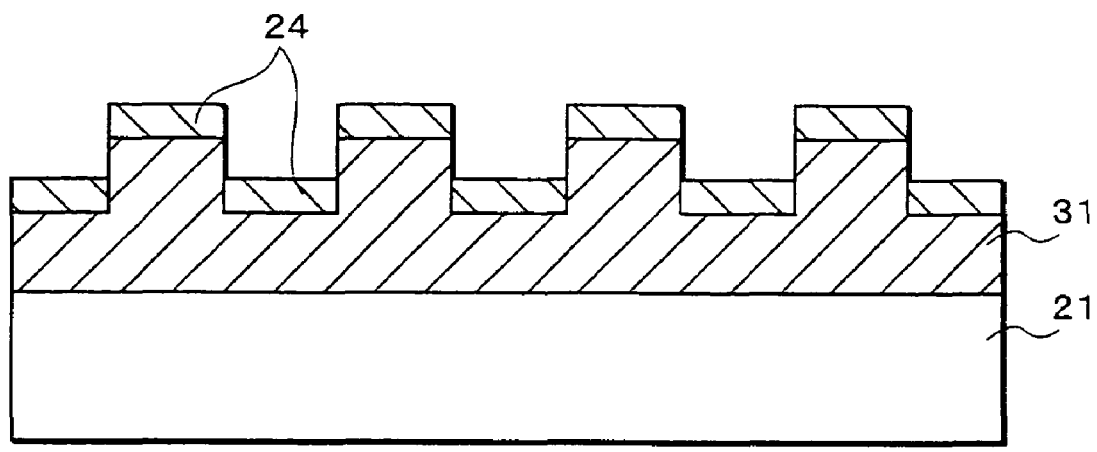
FIG. 5(*a*) is an explanatory view illustrating a state of a cut failure in an uneven section of a charge collection electrode of FIG. 1.
Figure 5:
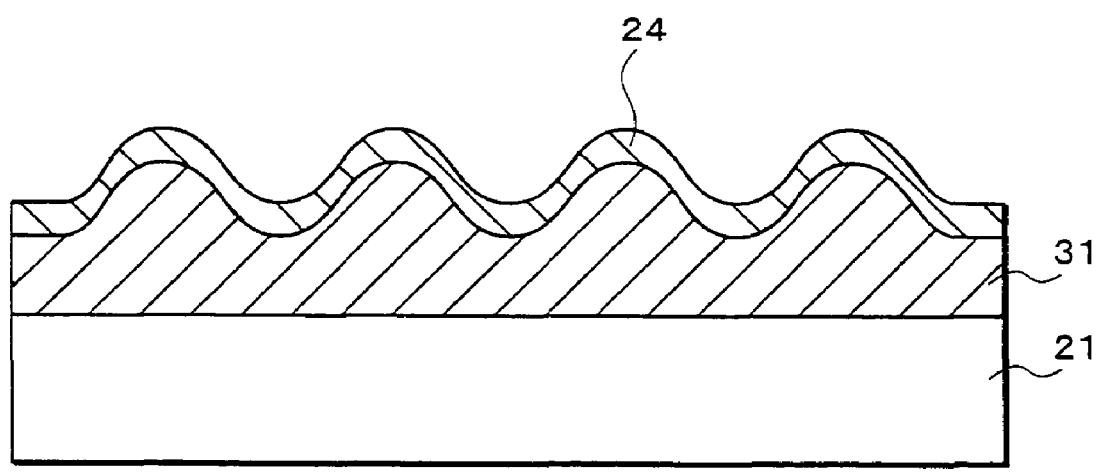

Here, if the uneven sections 51 composed of concave parts are formed in the charge collection electrode 24 at portions right above the TFT elements (active elements) 22, sufficient spacing between the charge collection electrode 24 and the TFT elements 22 cannot be ensured, leading to such problem that the potential of the charge collection electrode 24 adversely affects the driving of the TFT elements 22. Therefore, as illustrated in FIGS. 2 and 3, it is preferable that the uneven sections 41 or 51 be formed so as not to be overlapped with said active elements 22 in a layered direction.

The foregoing electromagnetic detector in accordance with the present embodiment offers such effect that the peeling of the semiconductor film 12 is less like to occur as compared to the conventional electromagnetic detector, and therefore, improved reliability and a wider temperature range for usable environments can be achieved.

Even when manufacturing the electromagnetic detector in such a manner that after forming the semiconductor film 12 on the active matrix substrate 11, a drive circuit or a readout circuit is formed with an application of heat treatment in the marginal region of the active matrix substrate, in the step of applying the heat treatment (for example, the thermo-compression bonding of the FPC onto the active matrix substrate 11), the peeling of the semiconductor film 12 from the charge collection electrode 24, i.e., from the active matrix substrate 11 caused by the difference in thermal expansion coefficient between the semiconductor film 12 and the insulating substrate 21 can be prevented.

In the foregoing preferred embodiment, explanations have been given through the case of adopting the a-Se film as the semiconductor film 12; however, as long as the uneven sections 41 or 51 serving as the bonding strength reinforcing member are formed on purpose on/in the charge collection electrode 24, even when adopting the semiconductor film 12 made of other material, the effect of reinforcing the bonding strength can be obtained. Further, the method of preparing the uneven sections 41 or 51 on/in the charge collection electrode 24 is not necessarily be limited to the method adopted in the present embodiment, and any other method may be adopted as long as the uneven sections 41 or 51 can be formed on/in the charge collection electrode 24 on purpose.

As another modified example of the present embodiment, a charge blocking layer 61 may be formed between the semiconductor film 12 and the charge collection electrodes 24. This charge blocking layer 61 is used to improve S/N of the electromagnetic detector by reducing dark current of the semiconductor film 12. Therefore, the charge blocking layer 61 prevents charges from entering from the charge collection electrode 24 into the semiconductor film 12. Specifically, in the case of adopting the a-Se film as the semiconductor film 12, a $Sb_2S_3$ film or an $As_2Se_3$ film, or a very thin $Al_2O_3$ film of, say, less than 200 Å thickness may be adopted as the charge blocking layer 61.

It may be also arranged so as to form other buffer layer between the semiconductor film 12 and the charge collection electrode 24. It is preferable that the buffer layer be formed to improve the adhesiveness between the semiconductor film 12 and the charge collection electrode 24. Here, the charge blocking layer 61 has uneven sections reflecting the shapes of the uneven sections 41 or 51 formed in/on the charge collection electrode 24.

Second Embodiment

The following will explain another embodiment of the present invention, with reference to FIGS. 8 through 11. In an electromagnetic detector and an active matrix substrate, a pixel array region indicates a region where electrode lines are arranged in matrix form, i.e., an active region where active elements and pixel electrodes are arranged in matrix form, and in particular for the electromagnetic detector, corresponds to an imaging region.

Figure 9:
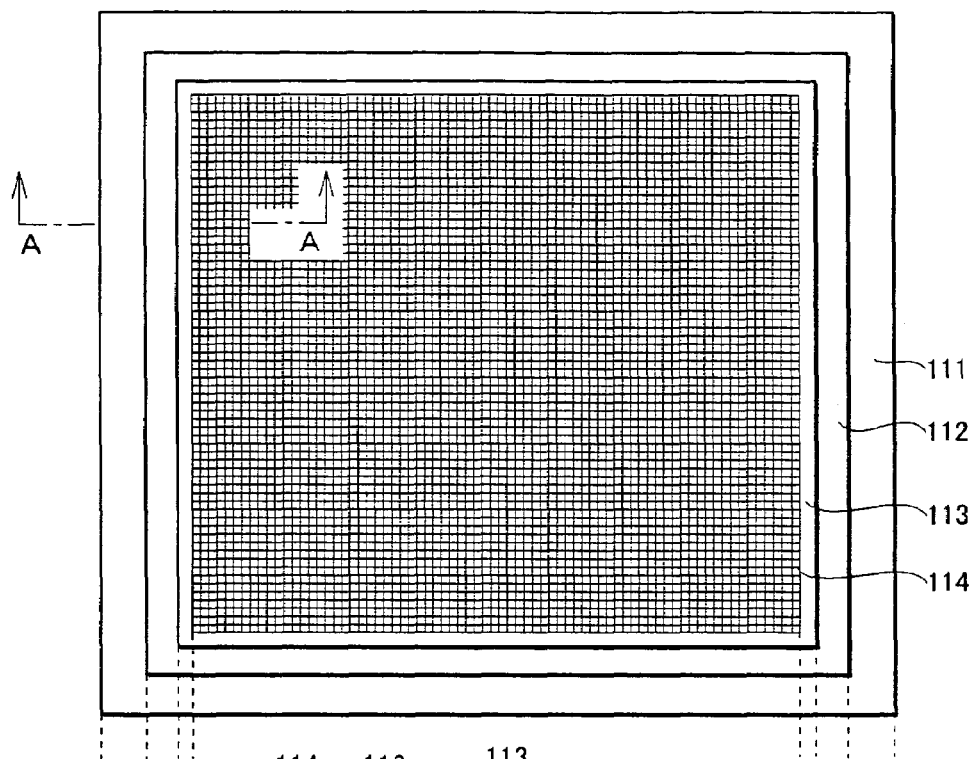
FIG. 9(a) is a plan view illustrating an electromagnetic detector in accordance with another embodiment of the present invention.
FIG. 9(b) is a longitudinal sectional view schematically illustrating a structure of the electromagnetic detector of FIG. 9(a)
Figure 9:
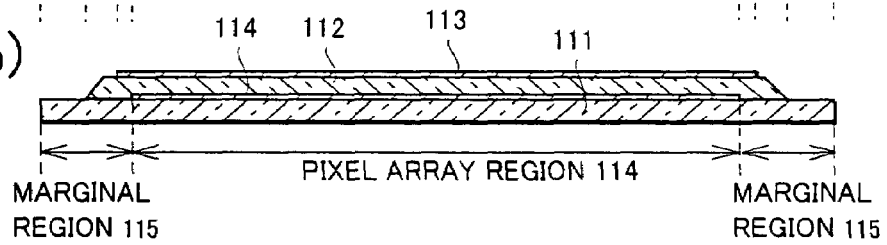

As illustrated in FIGS. 9(*a*) and 9(*b*), an electromagnetic detector in accordance with the present embodiment is mainly made up of an active matrix substrate 111, a semiconductor film (semiconductor layer) 112, and a bias electrode (common electrode) 113. The active matrix substrate 111 has an active matrix array in a pixel array region 114. The semiconductor film 112 generates charges in response to electromagnetic wave to be detected by the electromagnetic detector. The bias electrode 113 is provided for applying a bias voltage to the semiconductor film 112.

Figure 10:
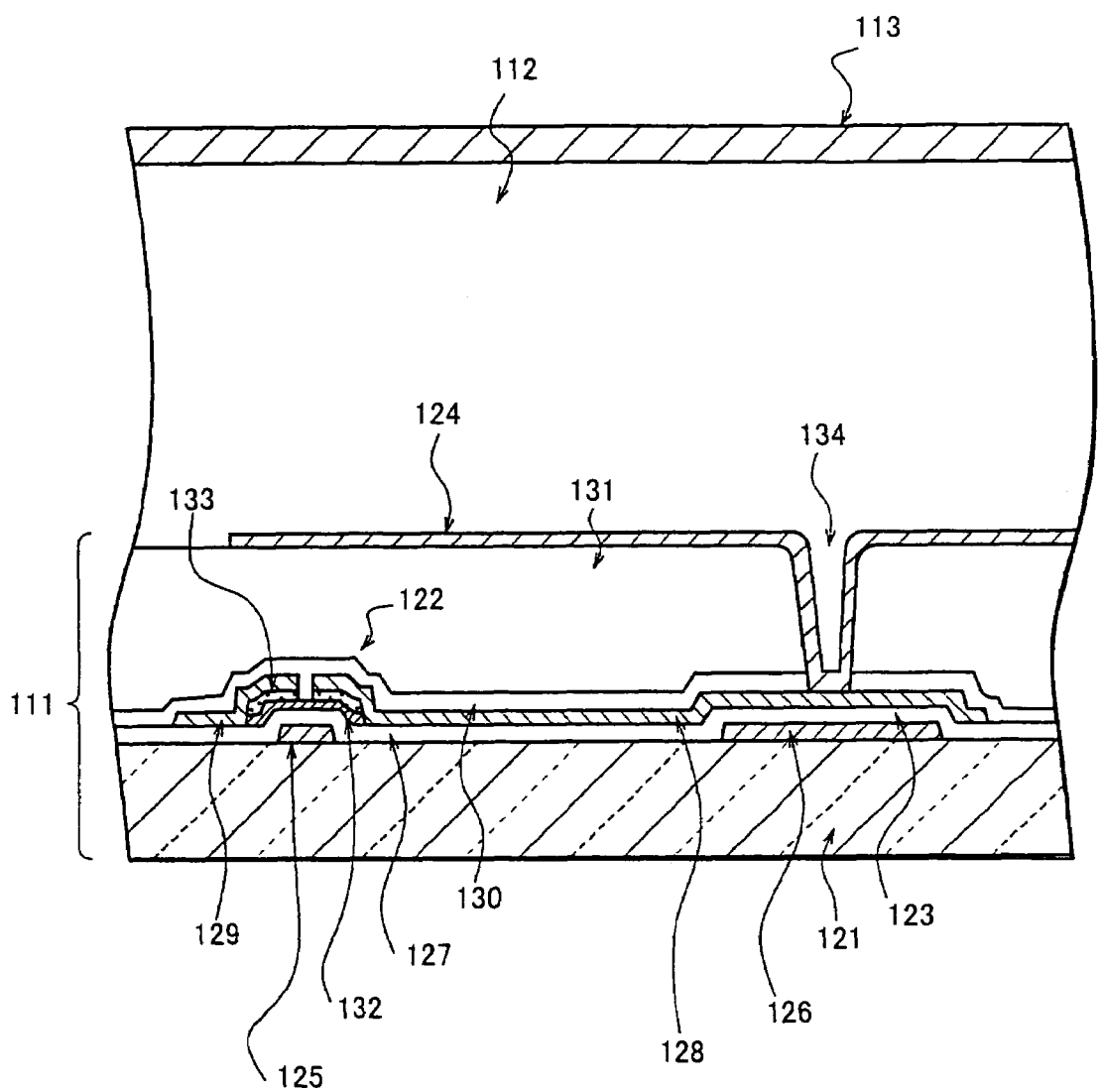
FIG. 10 is an enlarged longitudinal sectional view illustrating a structure around one pixel of the electromagnetic detector of FIG. 9(a)

As illustrated in FIG. 10, the active matrix substrate 111 includes an insulating substrate 121 made of glass, ceramics or similar material, whereon the above mentioned active matrix array is formed. In this active matrix array, a pixel array region is constituted by TFT elements (active elements) 122 made of a-Si, p-Si or similar material, charge storage capacitors (Cs) 123, charge collection electrodes (pixel electrode) 124, gate electrodes 125 and data electrodes (source electrodes) 129, etc., which are arranged in XY matrix form. The gate electrodes 125 and the data electrodes 129 constitute bus lines. For the active elements of the present invention, MIM elements or diode elements, etc., may be adopted other than the above-mentioned TFT elements 122.

The above-mentioned XY matrix is typically structured such that pixels in number in a range of 500×500 to 3000×3000, each pixel corresponding to a unit cell has a size in the range of 0.1×0.1 mm² to 0.3×0.3 mm², are arranged in matrix form.

The structure around one pixel of the electromagnetic detector will be explained in details in reference to the longitudinal sectional view of FIG. 10.

The active matrix substrate 111 is composed of the insulating substrate 121, made of, for example, glass substrate, having formed thereon the gate electrode 125, a charge storage capacitor (Cs) electrode 126, the charge storage capacitors 123, a gate insulating film 127, connection electrodes (drain electrodes) 128, the data electrodes (source electrodes) 129, the TFT elements 122, an insulating protective film 130, an interlayer insulating film (interlayer insulating layer) 131 and the charge collection electrodes (pixel electrodes) 124, etc. The TFT element 122 is made up of a channel layer 132 and a contact layer 133. In the interlayer insulating film 131, provided is a contact hole 134 for connecting the charge collection electrode 124 to the connection electrode 128. In the electromagnetic detector, the semiconductor film 112 and the bias electrode 113 are formed on the foregoing active matrix substrate 111.

The foregoing electromagnetic detector in accordance with the present embodiment may be manufactured, for example, by the below-exaplined method.

For the glass substrate of the insulating substrate 121, for example, no-alkali glass substrate (for example, #1737 of Corning) may be adopted. First, on this glass substrate, the gate electrodes 125 and the charge storage capacitor electrodes 126 made of Ta film or Al film or other metal film are formed. These electrodes 125 and 126 can be prepared by forming the metal film of 3000 Å thickness on the glass substrate by the sputtering deposition and then carrying out the patterning of the resulting metal film in shapes as desired.

Next, the gate insulating film 127 made of SiNx or SiOx or similar material of around 3500 Å thickness is formed almost over the entire upper surface of the glass substrate by the CVD method so as to cover the gate electrode 125 and the charge storage capacitor electrode 126. This gate insulating film 127 serves also as a dielectric layer for the charge storage capacitor 123. The material for the gate insulating film 127 is not limited to SiNx or SiOx, and an anodic oxide film prepared by anodizing the gate electrode 125 and the charge storage capacitor electrode 126 may be used in combination.

Next, the channel layer (i-layer) 132 which serves as a channel section of the TFT element (TFT) 122, and the contact layer 133 (n⁺-layer) for making the data electrode 129 contact the connection electrode (drain electrode) 128 are formed above the gate electrode 125 via the gate insulating film 127. These channel layer 132 and contact layer 133 are made of a-Si, and can be prepared by forming a-Si films of around 1000 Å and 400 Å thickness respectively by the CVD method and then carrying out the patterning of these a-Si films in respective shapes as desired.

Next, the data electrodes 129 and the connection electrodes (drain electrode) 128 are formed on the contact layer (n⁻-layer) 133. These connection electrodes 128 also serve as upper layer electrodes, each constituting the charge storage capacitor 123. In the same manner as the gate insulating film 127 and the charge storage capacitor electrodes 126 mentioned above, these data electrode 129 and connection electrode 128 are prepared by forming the metal films made of Ta or Al or similar material of 3000 Å thickness on the glass substrate by the sputtering deposition and then pattering the resulting metal film in shapes as desired.

Next, the insulating protective film 130 is formed almost over the entire surface of the insulating substrate 121 (glass substrate) having formed thereon the TFT elements or the charge storage capacitors 123, etc. This insulating protective film 130 is formed by forming an SiNx film of around 3000 Å thickness by the CVD method. Here, the SiNx film is removed from the portion above the connection electrodes 128, where the contact holes 134 is to be provided.

Next, the interlayer insulating film 131 is formed almost over the entire surface of the insulating protective film 130. This interlayer insulating film 131 is formed by forming a photosensitive acrylate resin film of around 3 μm thickness by a spinner or other application device. For the photosensitive organic material, polyimide resin or similar material may be equally adopted.

The interlayer insulating film 131 is then subjected to the exposure/developing processing (photolithograpy) by masking the upper surface with a photomask of a predetermined shielding pattern, thereby forming the contact hole 134 for each pixel. In the contact hole 134, a hole which passes through the interlayer insulating film 131 in the longitudinal direction is formed so as to expose the connection electrode (drain electrode) 128 in the lower layer.

Next, for the charge collection electrode (pixel electrode) 124, a conductive film is patterned on the interlayer insulating film 131 provided with the contact hole 134. The resulting charge collection electrode 124 is electrically connected to the connection electrode (drain electrode) 128 of the TFT element 122 via the contact hole 134.

For the charge collection electrode 124, for example, an Indium Tin Oxide (ITO) film, Indium Zinc Oxide (IZO) film, an aluminum (Al) film, an Al alloy film (Al—Nd, Al—Zr alloy, etc.,), or a laminated Al film and other conductive film (Al/Mo, Al/Ti, etc.,), may be adopted. In the present embodiment, the Al film, the Al alloy film and the laminated film of Al film and other conductive film are all referred to as a "conductive film made of a material including Al as a main component".

Next, on the active matrix substrate 111 thus prepared, the semiconductor film 112 made of a-Se having electromagnetic conductivity is formed over the entire surface of the pixel array region 114. This semiconductor film 112 is formed in around 0.5 to 1.5 mm thickness, preferably 1 mm thickness by the vacuum deposition in consideration of x-ray absorption efficiency. For the material of the semiconductor film 112, other than a-Se, CdTe, CdZnTe, PbI₂, HgI₂, SiGe, Si or similar material may be adopted. For an electromagnetic detector wherein the semiconductor film 112 is formed directly on the active matrix substrate 111 having formed thereon the active matrix array, an amorphous Se film (a-Se film) which permits a formation of a large size film by vacuum deposition at low temperature is the most suited.

Then, the bias electrode 113 made of Au, Al, or similar material of around 2000 Å thickness is formed over the entire surface of the semiconductor film 112 by vacuum deposition, thereby obtaining an electromagnetic detector as illustrated in FIGS. 9(a) and 9(b), and FIG. 10. To the bias electrode 113 formed in the uppermost layer, a bias voltage is applied from an externally connected high-voltage power supply.

Figure 8:
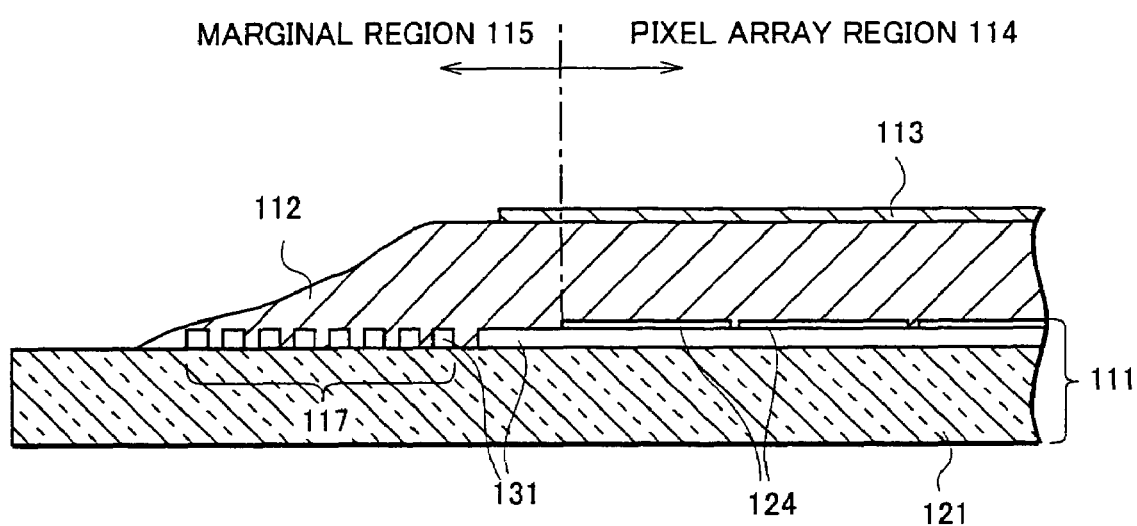
FIG. 8 which illustrates a structure of an electromagnetic detector in accordance with another embodiment of the present invention is a sectional view taken on line A-A of FIG. 9(a)

Next, the characteristic structures of the present embodiment will be explained in reference to FIG. 8. FIG. 8 is a sectional view taken on line A-A of FIG. 9(a). For convenience in explanations, the TFT elements 122 and electrode lines which constitute the active matrix substrate 111 are omitted from FIG. 8, and in FIG. 8, only the interlayer insulating film 131 and the charge collection electrode (pixel electrode) 124 are shown.

As illustrated in FIG. 8, the active matrix substrate 111 can be roughly divided into a pixel array region (active region, matrix region) 114 where electrode lines are arranged in matrix form, and an other region than the pixel array region 114, i.e., a marginal region 115 surrounding the pixel array region 114.

In the active matrix substrate 111, the interlayer insulating film 131 is formed over the pixel array region 114 and partially over the marginal region 115. In the marginal region 115, an uneven section 117 composed of at least a concave or convex part is formed in the interlayer insulating film 131. This uneven section 117 serves as a bonding strength reinforcing member, and is not necessarily be formed over the entire surface of the interlayer insulating film 131 in the marginal region 115, and the uneven section 117 is required to be formed only partially over the marginal region 115. In the electromagnetic detector, the semiconductor film 112 is formed ranging from the pixel array region 114 to the area of the uneven section 117 in the marginal region 115. Namely, in the marginal region 115, the semiconductor film 112 is formed on the interlayer insulating film 131, and the semiconductor film 112 fits the shape of the uneven section 117 to be bonded thereto.

Figure 11A:
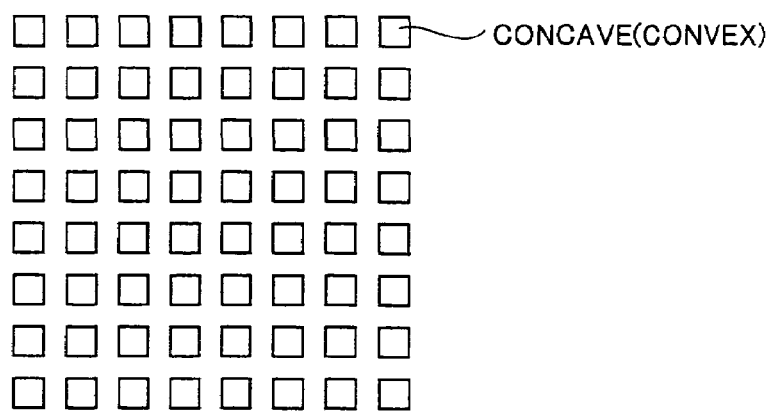
FIG. 11(a) is a plan view illustrating an example of a dot pattern for use in forming the uneven section of FIG. 8.
Figure 11B:
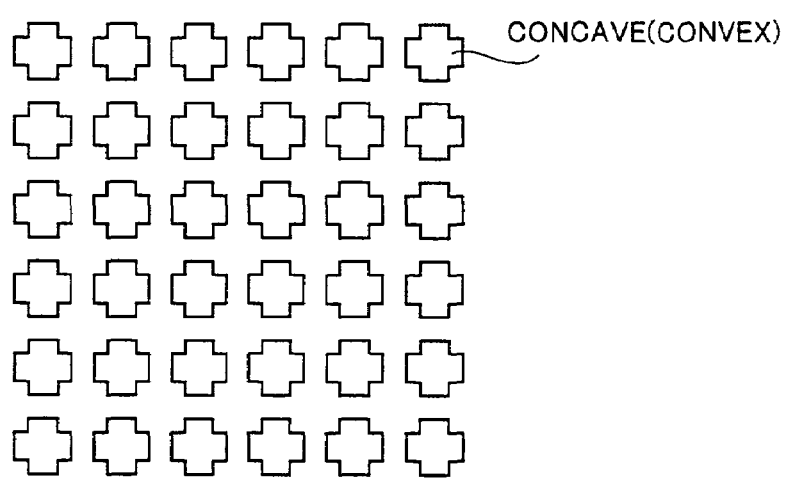
FIG. 11(b) is a plan view illustrating another dot pattern for use in forming the uneven section of FIG. 8.
Figure 11C:
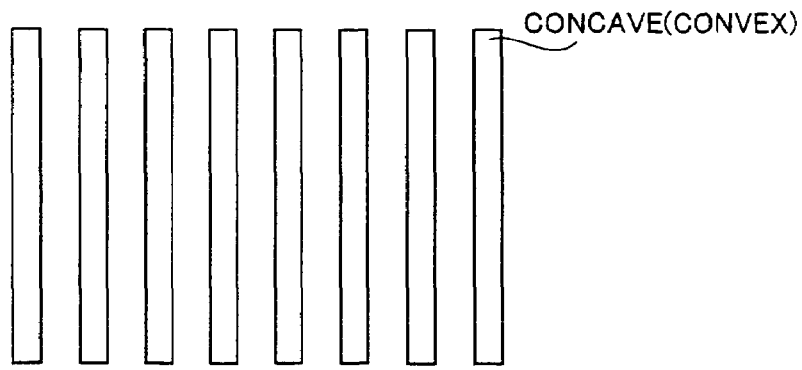
FIG. 11(c) is a plan view illustrating a striped pattern for use in forming the uneven section.

For the uneven section 117, convex parts may be arranged in dot pattern, striped pattern, wavy line pattern or other pattern at an appropriate density. For the uneven sections 117, those shown in FIG. 11(a) or FIG. 11(b), etc., may be adopted, and for the striped pattern, those shown in FIG. 11(c) may be adopted. The respective patterns shown in FIG. 11(a) through FIG. 11(c) are applicable to both the uneven sections 117 composed of convex parts and of concave parts.

For any of the dot pattern, striped pattern, or other pattern, for example, an uneven section having a depth/height of around 3 μm, or a width (diameter) of around 5 to 10 μm may be adopted.

The uneven sections 117 made of at least either concave parts or convex parts adopted in the present embodiment include not only those formed in concave or convex pattern, but also those formed in groove, hole, satin, satin pattern, etc.

Here, it is advantageous to adopt the uneven sections 117 composed of concave parts in that the concave parts can be formed in the interlayer insulating film 131 in the process of forming the contact holes 134 in the interlayer insulating film 131. As a result, the electromagnetic detector can be manufactured without requiring the additional step for forming the uneven sections 117, thereby preventing an increase in the steps in the process of manufacturing the electromagnetic detector.

Here, when acrylic resin is adopted for the interlayer insulating film 131, the glass substrate for the insulating substrate 121, and in the marginal region 115, the interlayer insulating film 131 is formed directly on the insulating substrate 121, the glass substrate has a very smooth surface (mirror surface) which lowers the bonding strength between the insulating substrate 121 and the interlayer insulating substrate 131. In this case, it is preferable that the inorganic thin film (inorganic film) made of SiNx, SiO$_2$ or similar material be formed in the lower layer of the interlayer insulating film 131 in the marginal region 115 of the active matrix substrate 111, as well as the pixel array region 114. Specifically, when forming the gate insulating film 127 and the insulating protective film 130 illustrated in FIG. 10, it is desirable that these films be extended to the interlayer insulating film 131 formed on the insulating substrate 121 in the marginal region 115 (to the area below the interlayer insulating film 131).

According to the foregoing structure of the electromagnetic detector, charges (electron-hole pairs) are generated in the semiconductor film 112 in response to electromagnetic wave incident thereon. In this state, the semiconductor film 112 is connected to the charge storage capacitors 123 in series. Therefore, with an application of bias voltage, the charges (electron-hole pair) as generated in the semiconductor film 112 respectively move to the positive electrode side and the negative electrode side respectively, thereby storing charges in the charge storage capacitor 123.

Further, by activating the TFT elements 122, the charges as stored in the charge storage capacitors 123 can be read in an external amplifier circuit (not shown) via the data electrodes 129. Here, the charge collection electrodes 124, the charge storage capacitors 123 and the TFT elements 122 are arranged in XY matrix form as mentioned above. Therefore, by reading the charges line by line in order by activating the TFT elements 122, two-dimensional information of electromagnetic wave to be detected by the electromagnetic detector can be obtained.

As described, the active matrix substrate 111 of the present embodiment is provided with the uneven sections 117 formed on/in the interlayer insulating film 131 on the marginal region 115. Therefore, the electromagnetic detector wherein the semiconductor film 112 and the bias electrodes 113 are laminated in this order on the active matrix substrate 111, i.e., the electromagnetic detector wherein the semiconductor film 112 is formed over the uneven sections 117 in the interlayer insulating film 131 in the marginal region 115, offers a larger contact area between the semiconductor film 112 and the interlayer insulating film 131 as compared to the electromagnetic detector without the uneven sections 117. Further, the semiconductor film 112 perfectly fits in the shape of the uneven sections 117 to be bonded thereto, and the contact portion between the semiconductor film 112 and the uneven sections 117 exhibits anchor effect by the uneven section 117 which further reinforces the bonding strength between them. Therefore, an improved bonding strength of the semiconductor film 112 with respect to the active matrix substrate 111 can be achieved. As a result, the peeling of the semiconductor film 112 from the interlayer insulating film 131, i.e., from the insulating substrate 121 caused by a difference in thermal expansion coefficient between the semiconductor film 112 and the insulating substrate 121, or the peeling of the semiconductor film 112 from the insulating substrate 121 caused by the deformation (warpage) of the electromagnetic detector due to an external force can be prevented.

Particularly, for the electromagnetic detector wherein the a-Se film as the semiconductor film 112 is formed on the active matrix substrate 111, and the glass substrate is adopted as the insulating substrate 121, the a-Se film has a thermal expansion coefficient in the range of 30 to 50 ($\times 10^{-6}$/° C.) which is approximately 1 digit larger than the thermal expansion coefficient (3 to 8 ($\times 10^{-6}$/° C.)) of the glass substrate in general use, thereby presenting the problem that the peeling of the a-Se film is liable to occur with changes in environmental temperatures. Also, the peeling of the a-Se film may be caused by even with a load of small external force exerted, for example, in a direction of bending the insulating substrate 121.

In view of the above problem, in the present embodiment, the uneven sections 117 are formed in the interlayer insulating film 131, and the semiconductor film 112 is formed over the uneven sections 117. With the structure, the semiconductor film 112 can be bonded to the interlayer insulating film 131 with a larger contact area, and further the contact portion between the semiconductor film 112 and the interlayer insulating film 131 exhibits anchor effect by the uneven section 117 which further reinforces the bonding strength between them. As a result, the peeling of the semiconductor film 112 from the insulating substrate 121 can be prevented.

The peeling of the semiconductor film 112 from the insulating substrate 121 is more likely to occur from the fringe portion of the semiconductor film 112. Therefore, with the structure of the present embodiment wherein the uneven sections 117 are formed in the interlayer insulating film 131 on the marginal region 115 of the active matrix substrate 111, the peeling of the semiconductor film 112 from the marginal region can be effectively prevented.

Figure 12:
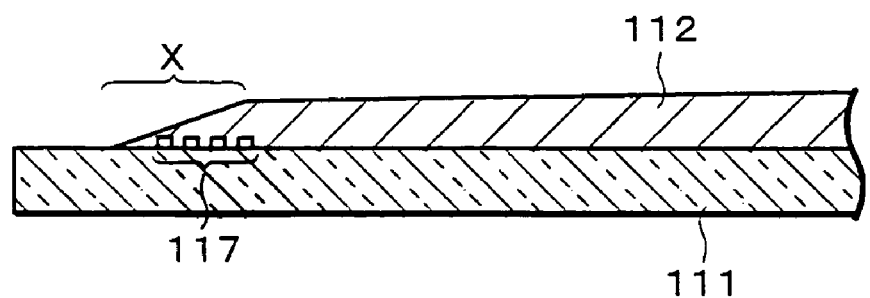
FIG. 12(a) which schematically illustrates a semiconductor film formed over the uneven section of FIG. 8 is a longitudinal sectional view schematically illustrating a structure of a portion with gradually reducing film thickness of the electromagnetic detector.
FIG. 12(b) is a sectional view schematically illustrating an electromagnetic detector without the portion with gradually reducing film thickness to be compared with FIG. 12(a)
Figure 12:
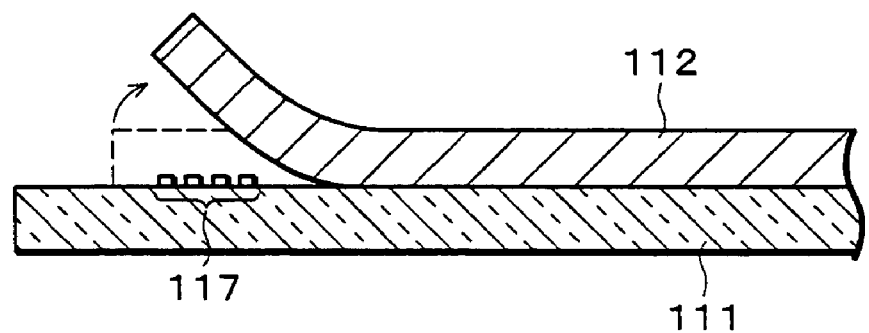

As illustrated in FIG. 8, the portion above the uneven sections 117 of the semiconductor film 112 are formed to be gradually thinner towards the outer circumference of the active matrix substrate 111. Specifically, for example, as illustrated in FIG. 12(a), the upper surface of the above portion is sloped downwards towards the outer circumference, i.e., a portion X with gradually reducing film thickness in FIG. 12(a). By adopting the portion X with gradually reducing film thickness, an absolute value for the film applied force on the uneven sections 117 of the semiconductor film 112 can be made smaller than that in the structure adopting the semiconductor film 112 of constant film thickness to the fringe portion as illustrated in FIG. 12(b). Therefore, the peeling of the semiconductor film 112 from the marginal region can be effectively prevented.

As a modified example of the present embodiment, a charge blocking layer or a buffer layer may be formed between the semiconductor film 112 and the charge collection electrode 124. Specifically, in the case of adopting the a-Se film as the semiconductor film 112, a $Sb_2S_3$ film or an $As_2Se_3$ film, or a very thin $Al_2O_3$ film of, say, less than 200 Å thickness may be adopted as the charge blocking layer as in the below-explained embodiments.

Third Embodiment

Figure 13:
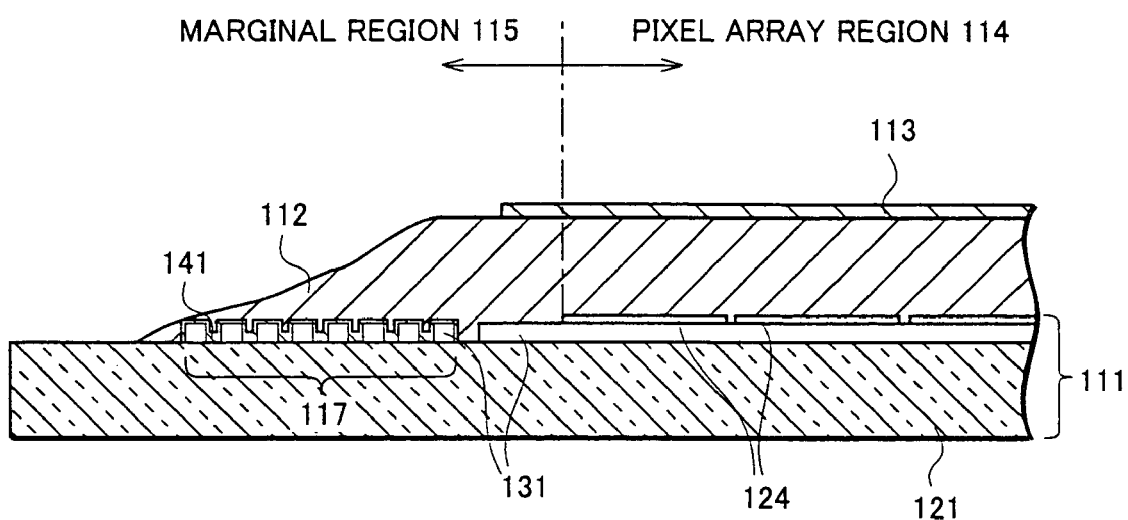
FIG. 13 which illustrates a structure of an electromagnetic detector in accordance with another embodiment of the present invention is a longitudinal sectional view of a portion corresponding to the portion shown in FIG. 8.

The following will explain still another embodiment of the present invention, with reference to FIG. 13.

The electromagnetic detector in accordance with the present embodiment has a structure shown in FIG. 13. As illustrated in FIG. 13, the electromagnetic detector of the present embodiment is arranged such that uneven sections 117 are formed in the interlayer insulating film 131 in the marginal region 115 of the active matrix substrate 111 as in the electromagnetic detector of the second embodiment, and further an inorganic film (inorganic layer) 141 is formed on the uneven sections 117. Other than that, the electromagnetic detector of the present embodiment has the same structure as that of the second embodiment.

The material of the above inorganic film 141 is not particularly limited; however, to prevent an increase in step of the manufacturing process of the electromagnetic detector (active matrix substrate 111), it is preferable to adopt the same material as the charge collection electrode (pixel electrode) 124. Non-limited examples for such material include an Indium Tin Oxide (ITO) film, Indium Zinc Oxide (IZO) film, an aluminum (Al) film, an Al alloy film (Al—Nd, Al—Zr alloy, etc.,), or a laminated film of Al film and other conductive film (Al/Mo, Al/Ti, etc.). In this case, the inorganic film 141 can be formed in the marginal region 115 when patterning the charge collection electrode 124.

The inorganic film 141 is provided with the following functions:

Firstly, the inorganic film 141 is functioned as a bonding strength reinforcing member for reinforcing the bonding strength between the interlayer insulating film 131 and the semiconductor film 112. Namely, even in the case where the material used in the interlayer insulating film 131 does not desirably match the semiconductor film 112 formed thereon, and for this mismatch of the materials, a sufficient effect of improving the bonding strength between the interlayer insulating film 131 and the semiconductor film 112 cannot be obtained from physical uneven sections 117 formed on the interlayer insulating film 131, by forming the inorganic film 141 in between, a desirable bonding strength can be obtained. The inorganic film 141 adopted in the present embodiment offers a higher bonding strength than the uneven sections 117, i.e., the surface of the interlayer insulating film 131, with respect to the semiconductor film 112.

Secondly, the inorganic film 141 serves as a protective film for protecting the uneven sections 117 from a drug solution in the manufacturing process. Namely, after forming the uneven sections 117 or the contact hole 134 in the interlayer insulating film 131, the patterning step of the charge collection electrode (pixel electrode) 124 is performed by the known photolithograpy techniques or etching techniques utilizing a photoresist. In this case, the interlayer insulating film 131 is exposed to a separation solution (drug solution) of the photoresist. Here, in the case of adopting the interlayer insulating film 131 made of acrylic resin, since the interlayer insulating film 131 has uneven sections 117, as compared to the case of the flat structure without the uneven sections 117, the uneven sections 117 themselves are more likely to be damaged by the drug solution, and a desirable patterning of the uneven sections 117 may not be ensured. In response, by covering the uneven sections 117 with the inorganic film 141, it is possible to maintain the uneven sections 117 in desirable shape without being exposed to the drug solution in the step of removing the photoresist.

Fourth Embodiment

Figure 14:
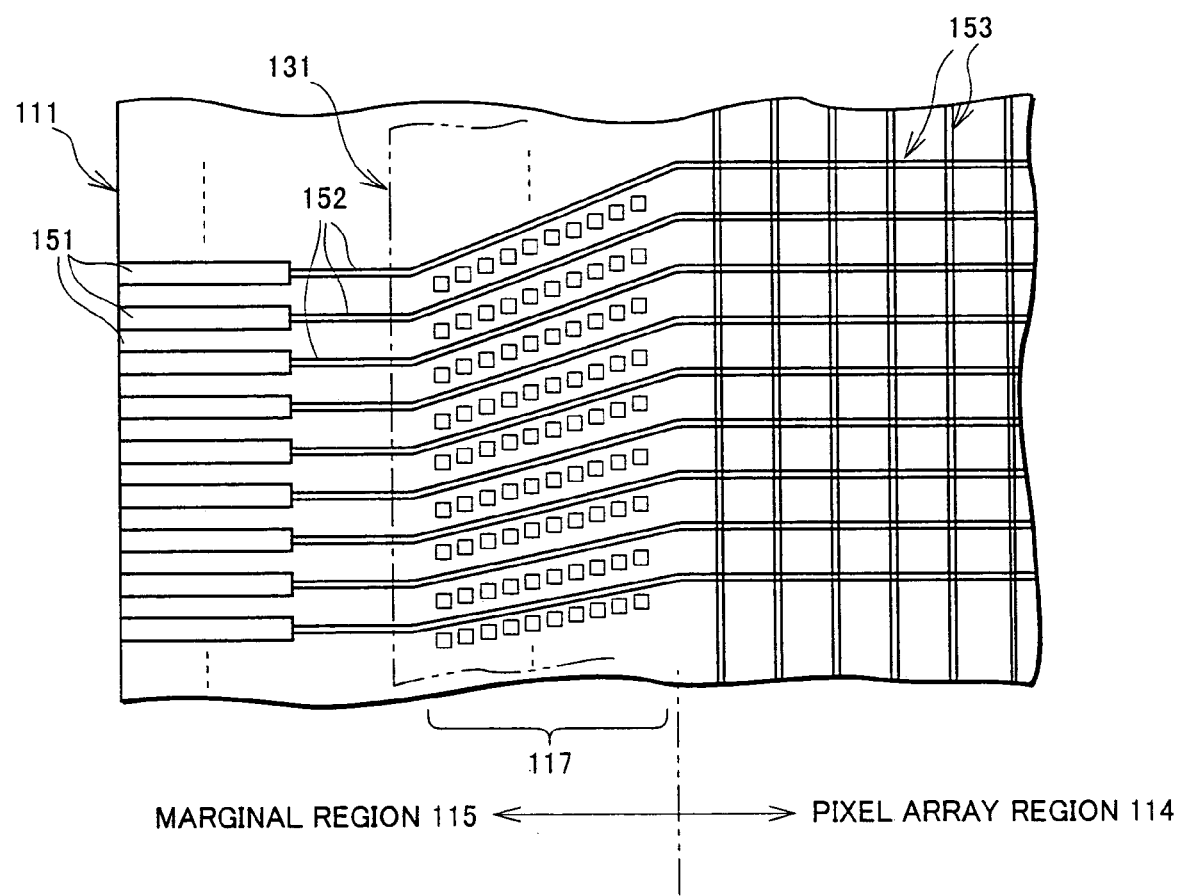
FIG. 14 which illustrates a structure of an electromagnetic detector in accordance with another embodiment of the present invention is a plan view of the portion around a marginal region of the active matrix substrate provided with uneven sections.
Figure 15:
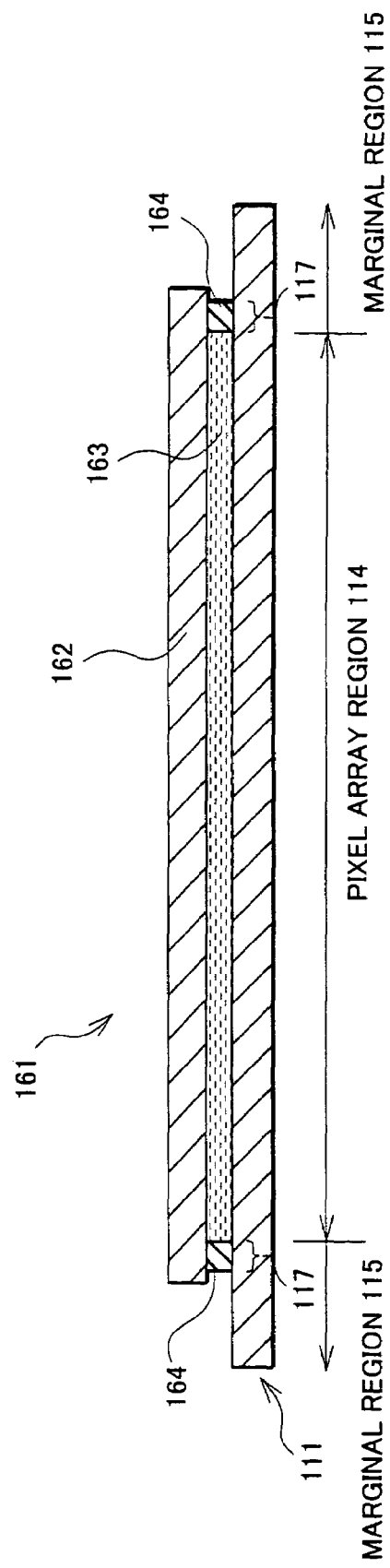
FIG. 15 is a longitudinal sectional view schematically illustrating a structure of a liquid crystal display device as an example application of the active matrix substrate in accordance with one embodiment of the present invention to the liquid crystal display device.
Figure 16:
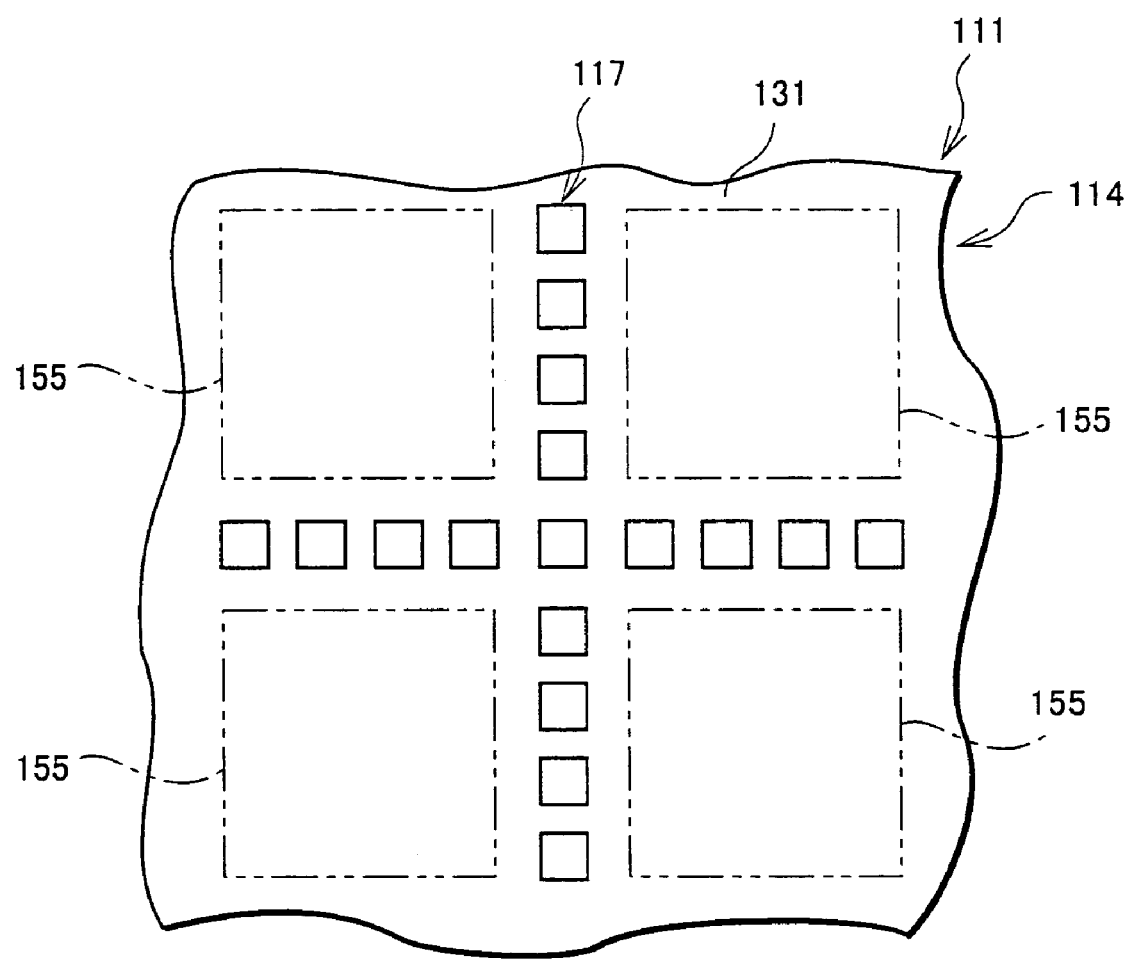
FIG. 16 which illustrates a structure of an electromagnetic detector in accordance with another embodiment of the present embodiment is a plan view of essential parts of a pixel array region of the active matrix substrate provided with uneven sections.
Figure 17:
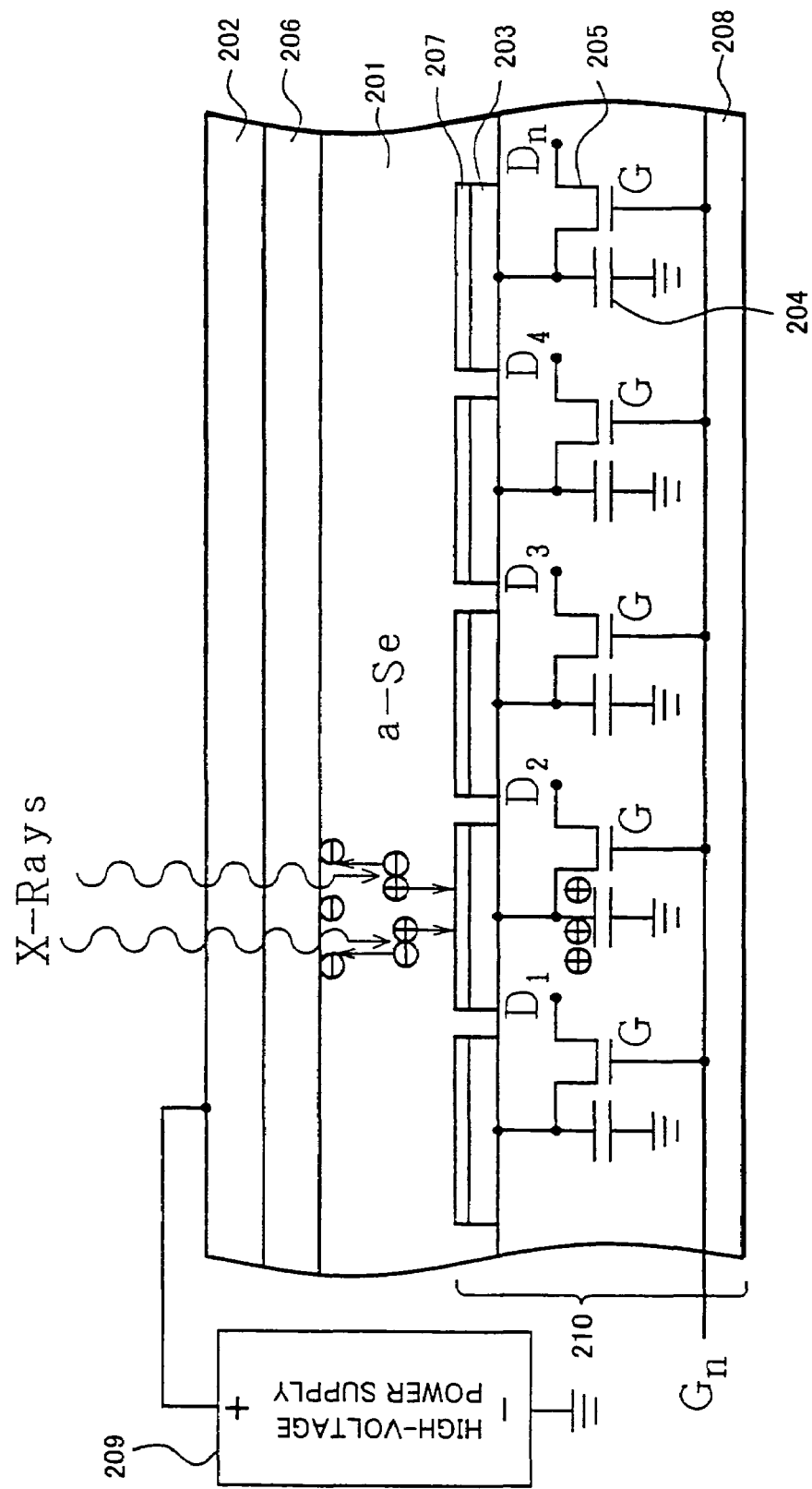
FIG. 17 is a longitudinal sectional view which explains an operation mechanism of a conventional electromagnetic detector.

The following will explain still another embodiment or the present invention, with reference to FIG. 14 through FIG. 16. In an electromagnetic detector in accordance with the present invention adopting the structure wherein the uneven sections 117 are formed in the interlayer insulating film 131 in the marginal region 115 of the active matrix substrate 111, a desirable arrangement of the uneven sections 117 is taken into consideration.

As illustrated in FIG. 14, the electromagnetic detector in accordance with the present embodiment includes uneven sections 117. FIG. 14 is a plan view of the active matrix substrate 111 of the electromagnetic detector in a portion around the marginal region 115. In this example, the uneven sections 117 composed of convex parts are adopted. The uneven sections 117 of the present invention are not necessarily be composed of the convex parts, and those composed of convex parts, or those formed in groove or other concave pattern or convex pattern may be adopted.

As illustrated in FIG. 14, the active matrix substrate 111 of the electromagnetic detector includes a plurality of connection terminals 151 formed in parallel in the fringe region. These connection terminals 151 are connected to electrode lines 153 formed in the pixel array region 114 in matrix form via the outgoing lines 152 formed in the marginal region 115. These outgoing lines 152 also serve as electrode lines; however, in this example, the outgoing lines 152 are adopted to be distinguished from the electrode lines 153 formed in the pixel array region 114.

The uneven sections 117 are formed in spaces between adjacent outgoing lines 152 so as not to be overlapped with the outgoing lines 152. Therefore, on the outgoing lines (electrode lines) 152, formed is the interlayer insulating film 131. With this arrangement, the electromagnetic detector of the present embodiment prevents such problem that noise generated in the semiconductor film 112 from being superimposed on the electrode lines 153, i.e., the connection terminals 151.

Specifically, in general, charges generated by x-ray irradiation, or thermal excitation in the semiconductor film 112, leading to the problem that unnecessary potentials brought by the resulting charges may be superimposed as noise components on the outgoing lines 152 in the lower layer. In response, by forming the uneven sections 117 so as not to be overlapped with the outgoing lines 152, it is possible to surely apart the outgoing lines 152 from the semiconductor film 112 by the thickness of the interlayer insulating film 131 (for example, 3 μm). It is therefore possible to reduce the electrostatic capacitance generated between the outgoing lines 152 and the semiconductor film 112, and to reduce an electronic coupling between the outgoing lines 152 and the semiconductor film 112. As a result, such problem that noise components are contaminated into detection signals of the electromagnetic detector, leading to a lower S/N ration can be prevented.

The foregoing structure of the active matrix substrate 111 is applicable to not only the electromagnetic detector but also to a liquid crystal display device 161 as illustrated in FIG. 15. This liquid crystal display device 161 is arranged such that a liquid crystal layer 163 is sealed between the active matrix substrate 111 and a counter substrate 162 by a seal member 164.

The seal member 164 is made of thermosetting resin or ultraviolet curing resin or similar material, and is formed over the uneven sections 117 in the marginal region 115 of the active matrix substrate 111. Namely, the fringe region on the side of the active matrix substrate 111 of the seal member 164 is bonded to the active matrix substrate 111 in shape to fit in the shape of the uneven sections 117.

With this structure, even with an applied weight in a direction of peeling the seal member 164 from the active matrix substrate 111 such as a bending weight, etc., the seal member 164 can be prevented from being peeled from the active matrix substrate 111 with ease. As a result, an improved reliability of the liquid crystal display device 161 can be achieved.

The foregoing electromagnetic detector in accordance with the present embodiment is not intended to be limited to the detector for radioactive ray such as x-ray, and, the present invention is also applicable to detectors for other electromagnetic wave of various kinds including a visible light, infrared light. The structure of the active matrix substrate 111 and the material for the semiconductor film 112 are not necessarily be limited to those adopted in the above embodiment, and other structures or materials of various kinds may be adopted.

In the foregoing preferred embodiment, the uneven sections 117 are formed in the interlayer insulating film 131 in the marginal region 115 of the active matrix substrate 111. With this structure, it is possible to prevent the peeling of the semiconductor film 112 surely and effectively. However, these uneven sections 117 are not necessarily be formed in the marginal region 115, and, for example, as illustrated in FIG. 16, the uneven sections 117 may be formed in/on the interlayer insulating film 131 in spacing between adjacent pixels 155 formed in the pixel array region 114. This structure also offers an improved anti-separation function for the semiconductor film 112 as compared with the case of adopting the structure without the uneven sections 117.

In the foregoing preferred embodiment, the uneven sections 117 are formed in the active matrix substrate 111 of the electromagnetic detector. However, the structure provided with the uneven sections 117 is also applicable to a final product of an active matrix substrate 111. Such active matrix substrate 111 is generally circulated in the market in the structure wherein the semiconductor film 112 or other film (layer) having a significantly different coefficient of thermal expansion from that of the insulating substrate 121 is formed on the upper surface of the active matrix substrate 111, or such final product of the active matrix substrate 111 circulated in the market is liable to deform or deformed, or the peeling of the film (layer) is liable to occur.

The electromagnetic detector of the present invention may be arranged such that an organic insulating layer having uneven sections formed in shape corresponding to the above mentioned uneven sections is formed under the charge collection electrode.

According to the foregoing structure, even when adopting a thin charge collection electrode of, say, for example, 0.1 to 0.2 μm thickness, by forming the uneven sections in/on the organic insulating layer, and further forming thereon the charge collection electrode, the uneven sections having height/depth in a range of 0.3 to 10 μm can be formed with ease. Further, when adopting an organic insulating layer for the insulating layer, the uneven sections with smoothed surface can be formed on the organic insulating layer with ease, for example, by a simple heat treatment. As a result, such inferior as cut failure in the charge collection electrode formed on the uneven sections can be prevented with ease.

The electromagnetic detector having the foregoing structure may be further arranged such that the charge collection electrode has a concave part to be functioned electrically.

According to the foregoing structure, the charge collection electrode is provided with the concave part to be functioned electrically, for example, for connecting the charge collection electrode to the charge storage capacitor, and/or in the structure with an active element for connecting the charge collection electrode to the active element. Therefore, the uneven section separately provided from the foregoing concave part can be used only for reinforcing the bonding strength of the semiconductor layer.

The electromagnetic detector having the foregoing structure may be further arranged such that the charge collection electrode has a connecting concave part, and the charge collection electrode is connected to the active element via the connecting concave part.

According to the foregoing arrangement, the charge collection electrode is provided with the connecting concave part, to be connected to the active element, and thus the uneven section separately provided from the foregoing connecting concave part can be used only for reinforcing the bonding strength of the semiconductor layer.

The electromagnetic detector having the foregoing structure may be further arranged such that the interlayer insulating layer has an uneven section formed in shape corresponding to the uneven section.

According to the foregoing structure, even when adopting a thin charge collection electrode of, say, for example, 0.1 to 0.2 µm thickness, by forming the uneven section in/on the interlayer insulating layer, and further forming thereon the charge collection electrode, the uneven section having height/depth in a range of 0.3 to 10 µm can be formed with ease.

The electromagnetic detector having the foregoing structure may be further arranged such that the interlayer insulating layer is made of an organic material.

According to the foregoing structure, by adopting an organic material as the interlayer insulating layer, the uneven sections with smoothed surface can be formed on the organic insulating layer with ease, for example, by a simple heat treatment. As a result, such failure as cut failure in the charge collection electrode on the uneven section can be prevented with ease.

The electromagnetic detector having the foregoing structure may be further arranged such that the charge collection electrode is formed over the interlayer insulating layer so as to cover the active element, and the uneven section is formed so as not to be overlapped with the active element in a layered direction.

According to the foregoing structure, the uneven section composed of, for example, the concave part can be adopted for the charge collection electrode without such problem that a distance between the charge collection electrode and the active electrode becomes shorter by the concave parts, which may lead to a problem that the driving of the active element is adversely affected by the potential of the charge collection electrode.

The electromagnetic detector having the foregoing structure may be further arranged such that the concave or convex part of the uneven section has a height or depth d from a surface of the charge collection electrode, satisfying the condition of:

$$0.3 \text{ µm} \leq d \leq 10 \text{ µm}.$$

According to the foregoing structure, by selecting the height/depth d from the surface of the charge collection electrode to satisfy the condition of 0.3 µm≦d, a sufficient bonding strength between the semiconductor layer and the uneven section of the charge collection electrode can be surely ensured. Further, by selecting the height/depth d from the surface of the charge collection electrode to satisfy the condition of d≦10 µm, the problem of an inferior coverage when forming the charge collection electrode can be prevented.

The electromagnetic detector having the foregoing structure may be further arranged such that the uneven section covers not less than 10 percent of an area of the charge collection electrode.

According to the foregoing structure, the uneven section covers not less than 10 percent of the area of the charge collection electrode, and thus the bonding strength between the semiconductor layer and the charge collection electrode can be surely improved.

The electromagnetic detector having the foregoing structure may be further arranged such that the uneven section is formed in plural number, and the plurality of uneven sections are arranged irregularly.

According to the foregoing structure, the plurality of uneven sections are arranged irregularly. Therefore, such problem that the bonding strength between the semiconductor layer and the charge collection electrode reinforced by the uneven sections becomes weaker in a particular direction than other directions can be surely prevented.

The electromagnetic detector having the foregoing structure may be further arranged such that the semiconductor layer is made of a material including Se as a main component.

According to the foregoing structure, since the semiconductor layer is made of a material including Se as a main component, and thus when laminating semiconductor layer on the charge collection electrode, it is possible to form a film of a large area directly on the charge collection electrode at low temperature, for example, by vacuum disposition. In this case, although the use of Se generally reduces the bonding strength with respect to the charge collection electrode, the bonding strength can be reinforced by the uneven section.

The electromagnetic detector having the foregoing structure may be further arranged such that the charge collection electrode is made of a material including Al as a main component.

According to the foregoing structure, for the charge collection electrode, by adopting Al having a thermal expansion coefficient close to that of the material such as Se adopted in the semiconductor layer formed thereon, the peeling of the semiconductor layer caused by the thermal expansion can be surely prevented.

The electromagnetic detector having the foregoing structure may be further arranged so as to include a charge blocking layer formed between the charge collection electrode and the semiconductor layer.

According to the foregoing structure, dark current of the semiconductor layer can be reduced by the charge blocking layer, and whereby an improved S/N of the electromagnetic detector can be obtained.

The active matrix substrate of the present invention may be further arranged such that the interlayer insulating layer is made of a photosensitive organic material.

According to the foregoing structure, the interlayer insulating film of, for example, 1 to 5 µm thickness can be formed, for example, by the spin coating method with ease. Further, the interlayer insulating layer itself has photosensitivity, and thus, the uneven section can be formed in/on the interlayer insulating layer by the photolithograpy with ease.

The active matrix substrate having the foregoing structure may be arranged such that the surface of the uneven section is covered with an inorganic layer.

According to the foregoing structure, even in the case where the material used in the interlayer insulating layer does not desirably match the material used in the semiconductor film formed on the interlayer insulating layer, and for this mismatch of the materials, a sufficient effect of improving the bonding strength between the interlayer insulating layer and the semiconductor film cannot be obtained at the portion where uneven sections are formed in/on the interlayer insulating layer, by forming the inorganic film in between, a desirable bonding strength between the interlayer insulating layer and the semiconductor film can be obtained.

The active matrix substrate having the foregoing structure may be arranged such that the inorganic layer is made of the same material as the pixel electrode.

According to the foregoing structure, the inorganic layer can be formed in the process of forming the pixel electrode. Therefore, the inorganic layer can be formed on the uneven sections, i.e., a possible reduction in bonding strength at the portion where the uneven sections are formed due to the mismatching of materials between the interlayer insulating layer and the semiconductor layer can be prevented, and thus a desirable bonding strength can be obtained without increasing the number of steps in the manufacturing process.

The active matrix substrate having the foregoing structure may be arranged such that the uneven section is formed so as to go through the interlayer insulating layer in an area in contact with the insulating substrate; and a surface of the uneven section is covered with an inorganic layer.

According to the foregoing structure, for example, even when adopting the glass substrate with a very smooth surface (mirror surface) as an insulating substrate, the part of the semiconductor layer formed over the uneven sections of the interlayer insulating layer, which reaches the bottom surface of the interlayer insulating layer via the through-hole structure of the uneven sections does not contact the mirror surface of the glass substrate but contact the surface of the inorganic layer. In this case, the inorganic layer offers a higher bonding strength than the surface of the insulating substrate with respect to the semiconductor layer, and the semiconductor layer has a desirable bonding strength at the portion where the uneven sections are formed.

The active matrix substrate having the foregoing structure may be arranged such that the uneven section is formed so as not to be overlapped with the electrode lines in a layered direction of the interlayer insulating layer with respect to the electrode lines.

According to the foregoing structure, in the structure wherein, for example, the semiconductor layer is formed on the active matrix substrate, it is possible to apart the electrode lines from the semiconductor layer by the thickness of the interlayer insulating layer. It is therefore possible to reduce an electrostatic capacitance to be generated between the electrode lines and the semiconductor layer, and to reduce the unnecessary electric coupling between the electrode lines and the semiconductor layer. As a result, it is possible to prevent the contamination of noise components generated from the semiconductor layer in the electrode lines, which would leads to the problem of lower S/N ratio of the active matrix substrate.

The electromagnetic detector in accordance with the present invention may be arranged so as to include the active matrix substrate having any of the foregoing structures, a semiconductor layer having electromagnetic conductivity formed so as to cover a pixel array region and at least partially cover a marginal region surrounding the pixel array region, wherein this semiconductor layer is formed over the uneven section formed on the marginal region.

According to the foregoing structure, a highly reliable electromagnetic detector can be realized in which the problem of the peeling of the semiconductor layer from the active matrix substrate is less likely to occur.

The electromagnetic detector having the foregoing structure may be arranged such that a portion above the uneven sections is formed gradually thinner towards an outer circumference of the active matrix substrate.

According to the foregoing structure, the peeling of the semiconductor layer from the outer circumference of the semiconductor layer can be surely prevented.

The electromagnetic detector having the foregoing structure may be arranged such that the surface of the uneven sections is covered with an inorganic layer.

According to the foregoing arrangement, even in the case where the material used in the interlayer insulating layer does not desirably match the material used in the semiconductor film on the interlayer insulating layer, and for this mismatch of the materials, a sufficient bonding strength between the interlayer insulating layer and the semiconductor film cannot be obtained at the portion where uneven sections are formed, since the surface of the uneven sections is covered with the inorganic layer which offers a higher bonding strength than the surface of the uneven sections with respect to the semiconductor layer formed thereon, a desirable bonding strength can be obtained at the portion where uneven sections are formed.

The electromagnetic detector having the foregoing structure may be arranged such that the surface of the uneven section is covered with an inorganic layer which is made of the same material as the pixel electrode.

According to the foregoing structure, the inorganic layer can be formed in the process of forming the pixel electrode. Therefore, the inorganic layer can be formed over the uneven sections, i.e., a possible reduction in bonding strength at the portion where the uneven sections are formed due to this mismatching of materials can be prevented, and thus a desirable bonding strength can be obtained without increasing the number of steps in the manufacturing process.

The electromagnetic detector having the foregoing structure is arranged such that:

the uneven section is formed so as to go through the interlayer insulating layer in an area in contact with the insulating substrate; and an inorganic layer is formed on the uneven section between the interlayer insulating layer and the insulating substrate, the inorganic layer having a higher bonding strength with respect to the semiconductor layer than that of a surface of the insulating substrate.

According to the foregoing structure, for example, even when adopting the glass substrate with a very smooth surface (mirror surface) as an insulating substrate, the part of the semiconductor layer formed over the uneven sections of the interlayer insulating layer, which reaches the bottom surface of the interlayer insulating layer via the through-hole structure of the uneven sections does not contact the mirror surface of the glass substrate but contact the surface of the inorganic layer. In this case, the inorganic layer offers a higher bonding strength than the surface of the Insulating substrate with respect to the semiconductor layer, and the semiconductor layer has a desirable bonding strength at the portion where the uneven sections are formed.

Another electromagnetic detector of the present invention is an active matrix type electromagnetic detector, which includes an insulating substrate, a charge storage capacitor formed above said insulating substrate, a charge collection electrode formed over said charge storage capacitor, the charge collection electrode being connected to the charge storage capacitor, a semiconductor layer having electromagnetic conductivity, formed over the charge collection electrode, and an uneven section formed in/on said charge collection electrode, dedicated for use in reinforcing a bonding strength between the semiconductor layer and said charge collection electrode, the uneven section being composed of at least a concave or convex part.

A still another electromagnetic detector of the present invention is an active matrix type electromagnetic detector which includes: an active matrix substrate which includes an insulating substrate having formed thereon a charge storage capacitor, a plurality of electrode lines arranged in matrix form, an active element provided at each intersection between the electrode lines, an interlayer insulating layer formed over the electrode lines and the active element, and a charge collection electrode formed on the interlayer insulating layer, the charge collection electrode being connected to the charge storage capacitor, a semiconductor layer having electromagnetic conductivity formed over said charge collection electrode on said active matrix substrate, and an uneven section formed in/on the charge collection electrode, dedicated for use in reinforcing a bonding strength between the semiconductor layer and the charge collection electrode, the uneven section being composed of at least a concave or convex part.

A still another electromagnetic detector of the present invention is an active matrix type electromagnetic detector which includes: an active matrix substrate which includes an insulating substrate having formed thereon a charge storage capacitor, a plurality of electrode lines arranged in matrix form, an active element provided at each intersection between the electrode lines, an interlayer insulating layer formed over the electrode lines and the active element, and a charge collection electrode formed on the interlayer insulating layer, the charge collection electrode being connected to the charge storage capacitor, a semiconductor layer having electromagnetic conductivity formed over said charge collection electrode on said active matrix substrate, and an uneven section formed in/on the charge collection electrode in an area not in contact with the active element and the charge storage capacitor, the uneven section being composed of at least a concave or convex part.

The active matrix substrate of the present invention may be arranged such that an inorganic layer is formed over the active matrix substrate so as to cover the surface of the uneven section in contact with an uneven section, the inorganic layer having a higher bonding strength with respect to the semiconductor layer than that of the surface of the uneven section.

The active matrix substrate of the present invention may be arranged so as to include an uneven section formed so as to go through the interlayer insulating layer in an area in contact with said insulating substrate, a semiconductor layer formed over the active matrix substrate, the semiconductor layer in contact with the uneven section formed between the interlayer insulating layer and the insulating substrate in the area of the uneven section, and an inorganic layer formed over said uneven section, which has a higher bonding strength with respect to said semiconductor layer than that of the surface of the insulating substrate.

A still another electromagnetic detector of the present invention is arranged so as to include an active matrix substrate which has a pixel array region in which a plurality of electrode lines are arranged in matrix form, and a plurality of active elements are provided at respective intersections between the electrode lines, and a marginal region surrounding the pixel array region, and a semiconductor layer having electromagnetic conductivity formed on the surface of the active matrix substrate so as to cover the pixel array region and partially cover the marginal region, wherein an uneven section composed of at least concave or convex part is formed at least on a surface of the active matrix substrate in contact with the semiconductor layer in the marginal region.

The electromagnetic detector of the present invention may be arranged so as to include an active matrix substrate, which includes an insulating substrate having formed thereon a plurality of electrode lines arranged in matrix form, an active element provided at each intersection between the electrode lines, an interlayer insulating layer, and a plurality of pixel electrodes, and a semiconductor having electromagnetic conductivity as laminated in this order, wherein an uneven section is provided in/on at least a part of an upper surface of said interlayer insulating layer formed on the marginal region, the uneven section being composed of at least a concave or convex part.

The electromagnetic detector of the foregoing structure may be further arranged such that the surface of the uneven section is converted with an inorganic layer, which offers a higher bonding strength than the surface of the insulating substrate with respect to the semiconductor layer.

The electromagnetic detector of the foregoing structure may be further arranged such that the surface of the uneven section is converted with an inorganic layer, which offers a higher bonding strength than the surface of the insulating substrate with respect to the semiconductor layer, and that the inorganic layer is made of the same material as the pixel electrode.

The concrete embodiments and implementation examples discussed in the foregoing detailed explanation of the present invention serve solely to illustrate the technical details of the invention, which should not be narrowly interpreted within the limits of such concrete examples, but rather may be applied in many variations without departing from the spirit of this invention and the scope of the patent claims set forth below.

What is claimed is:

1. An active matrix substrate, comprising:
   an insulating substrate having formed thereon a plurality of electrode lines arranged in matrix form, an active element provided at each intersection between said electrode lines, an interlayer insulating layer formed over said electrode lines and said active elements, and a plurality of pixel electrodes formed on said interlayer insulating layer,
   wherein said interlayer insulating layer is formed so as to cover a pixel array region in which said electrode lines are arranged in matrix form and at least partially cover a marginal region surrounding said pixel array region; and
   an uneven section is provided in/on at least a part of an upper surface of said interlayer insulating layer, wherein said uneven section is formed at least at said marginal region, said uneven section comprising at least a concave and/or convex part, and wherein the concave and/or convex part is provided independently of stepped parts of layers below the interlayer insulating layer, and wherein a surface of said uneven section is covered with an inorganic material.

2. The active matrix substrate as set forth in claim 1, wherein said interlayer insulating layer is made of a photosensitive organic material.

3. The active matrix substrate as set forth in claim 1, wherein said inorganic layer is made of a same material as said pixel electrodes.

4. The active matrix substrate as set forth in claim 1, wherein said uneven section is formed so as to go through said interlayer insulating layer in an area in contact with said insulating substrate; and
   a surface of said uneven section is covered with an inorganic layer.

5. The active matrix substrate as set forth in claim 1, wherein said uneven section is formed so as not to be overlapped with said electrode lines in a layered direction of said interlayer insulating layer with respect to said electrode lines.

6. The active matrix substrate as set forth in claim 1, wherein said uneven section is composed of a concave part.

7. An electromagnetic detector, comprising
   an active matrix substrate, which includes:
   an insulating substrate having formed thereon a plurality of electrode lines arranged in matrix form, an active element provided at each intersection between said electrode lines, an interlayer insulating layer formed over said electrode lines and said active element, and a plurality of pixel electrodes formed on said interlayer insulating layer, wherein said interlayer insulating layer is formed so as to cover a pixel array region in which said electrode lines are arranged in matrix form and at least partially cover a marginal region surrounding said pixel array region; and an uneven section is provided in/on at least a part of an upper surface of said interlayer insulating layer, said uneven section being formed at said marginal region, said uneven section being composed of at least a concave or convex part, said electromagnetic detector further comprising:

a semiconductor layer having electromagnetic conductivity, formed so as to cover said pixel array region and at least partially cover said marginal region of said active matrix substrate, said semiconductor layer being formed over said uneven section on said marginal region.

8. The active matrix substrate as set forth in claim 7, wherein a surface of said uneven section is covered with an inorganic material.

9. The electromagnetic detector as set forth in claim 7, wherein said semiconductor layer is arranged such that a portion above said uneven section is made gradually thinner towards an outer circumference of said active matrix substrate.

10. The detector of claim 7, wherein the concave and/or convex part is provided independently of stepped parts of layers below the interlayer insulating layer.

11. A liquid crystal display device, comprising:

an active matrix substrate which includes an insulating substrate having formed thereon a plurality of electrode lines arranged in matrix form, an active element provided at each intersection between said electrode lines, an interlayer insulating layer formed over said electrode lines and said active element, and a plurality of pixel electrodes formed on said interlayer insulating layer, wherein said interlayer insulating layer is formed so as to cover a pixel array region in which said electrode lines are arranged in matrix form and at least partially cover a marginal region surrounding said pixel array region; and an uneven section is provided in/on at least a part of an upper surface of said interlayer insulating layer, said uneven section being formed at said marginal region, said uneven section comprising at least a concave and/or convex part, said liquid crystal display device further comprising:

a seal member formed on said uneven section, for sealing a liquid crystal layer on said marginal region of said active matrix substrate, and wherein the concave and/or convex part is provided independently of stepped parts of layers below the interlayer insulating layer, and wherein a surface of said uneven section is covered with an inorganic material.

12. An electromagnetic detector, comprising:

an active matrix substrate provided with a pixel array region where a plurality of electrode lines are arranged in matrix form, and an active element is provided at each intersection between said electrode lines, and a marginal region surrounding said pixel array region; and a semiconductor layer having electromagnetic conductivity formed over a surface of said active matrix substrate so as to cover said pixel array region and at least partially cover said marginal region, wherein an uneven section is provided in/on at least a part of a surface of said marginal region facing said semiconductor layer, said uneven section being composed of at least a concave and/or convex part.

13. The electromagnetic detector as set forth in claim 12, wherein a surface of said uneven section is covered with an inorganic layer.

14. The detector of claim 12, wherein the concave and/or convex part is provided independently of stepped parts of layers below the interlayer insulating layer.

15. An electromagnetic detector, comprising:

an insulating substrate, whereon a plurality of electrode lines arranged in matrix form, and an active element provided at each intersection between said electrode lines, an interlayer insulating layer, a plurality of pixel electrodes, and a semiconductor layer having electromagnetic conductivity are laminated in this order, wherein an uneven section is provided in/on at least a part of a surface of said interlayer insulating layer facing said semiconductor layer, said uneven section being located at a marginal region of the detector outside of an area where the pixel electrodes are provided and the uneven section comprising at least a concave or convex part.

16. The electromagnetic detector as set forth in claim 15, wherein a surface of said uneven section is covered with an inorganic layer.

17. The electromagnetic detector as set forth in claim 15, wherein a surface of said uneven sections is covered with an inorganic layer made of a same material as said pixel electrodes.

18. The electromagnetic detector as set forth in claim 15, wherein said uneven section is formed so as to go through said interlayer insulating layer in an area in contact with said insulating substrate; and an inorganic layer is formed on said uneven section between said interlayer insulating layer and said insulating substrate, said inorganic layer having a higher bonding strength with respect to said semiconductor layer than that of a surface of said insulating substrate.

19. The detector of claim 15, wherein the concave and/or convex part is provided independently of stepped parts of layers below the interlayer insulating layer.

* * * * *